United States Patent
Kitazato et al.

(10) Patent No.: US 10,511,887 B2
(45) Date of Patent: Dec. 17, 2019

(54) RECEPTION APPARATUS, RECEPTION METHOD, TRANSMISSION APPARATUS, TRANSMISSION METHOD, PROGRAM, AND BROADCASTING SYSTEM

(75) Inventors: Naohisa Kitazato, Tokyo (JP); Yoshiharu Dewa, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 13/080,866

(22) Filed: Apr. 6, 2011

(65) Prior Publication Data

US 2012/0054235 A1 Mar. 1, 2012

Related U.S. Application Data

(60) Provisional application No. 61/383,244, filed on Sep. 15, 2010, provisional application No. 61/378,239, filed on Aug. 30, 2010.

(51) Int. Cl.
| | |
|---|---|
| *H04N 21/65* | (2011.01) |
| *H04N 21/462* | (2011.01) |
| *H04N 21/432* | (2011.01) |
| *H04N 21/433* | (2011.01) |
| *H04N 21/434* | (2011.01) |

(Continued)

(52) U.S. Cl.
CPC ....... *H04N 21/4622* (2013.01); *H04N 21/432* (2013.01); *H04N 21/4332* (2013.01); *H04N 21/4349* (2013.01); *H04N 21/6112* (2013.01); *H04N 21/6125* (2013.01);

(Continued)

(58) Field of Classification Search
CPC .............................. G06F 2213/0038
USPC ....... 707/706, 722, 736, 758, 759, 769, 770, 707/781, 999.01; 709/203, 219, 224, 226, 709/247, 249
See application file for complete search history.

(56) References Cited

U.S. PATENT DOCUMENTS 6,067,107 A  *  5/2000  Travaille et al. ............... 725/24
6,493,748 B1    12/2002  Nakayama et al.
(Continued)

FOREIGN PATENT DOCUMENTS

| CN | 101657800 | 2/2010 |
|---|---|---|
| EP | 0817444 | * 1/1998 |

(Continued)

OTHER PUBLICATIONS

U.S. Appl. No. 12/980,917, filed Dec. 29, 2010, Dewa.

(Continued)

*Primary Examiner* — Syling Yen
(74) *Attorney, Agent, or Firm* — Oblon, McClelland, Maier & Neustadt, L.L.P.

(57) ABSTRACT

Disclosed herein is a reception apparatus for receiving data, including: a determination block configured to determine an acquisition source of a file to be acquired by the reception apparatus in a predetermined sequence from among a plurality of storage media in which the file is stored; an acquisition block configured to acquire the file from the acquisition source on the basis of file acquisition information for use in acquiring the file in the plurality of storage media, the file acquisition information being common to the plurality of storage media; and an execution block configured to execute the acquired file.

21 Claims, 27 Drawing Sheets

(51) Int. Cl.
*H04N 21/61* (2011.01)
*H04N 21/6543* (2011.01)
*H04N 21/858* (2011.01)

(52) U.S. Cl.
CPC ..... *H04N 21/6543* (2013.01); *H04N 21/8586* (2013.01); *G06F 2213/0038* (2013.01)

(56) References Cited

U.S. PATENT DOCUMENTS

| | | | |
|---|---|---|---|
| 7,117,253 | B2 | 10/2006 | Nakayama et al. |
| 7,558,879 | B2 | 7/2009 | Nishio et al. |
| 7,774,791 | B1* | 8/2010 | Appelbaum ........... G06Q 10/06 705/1.1 |
| 8,166,186 | B2* | 4/2012 | Inokuchi ...................... 709/230 |
| 2002/0162117 | A1 | 10/2002 | Pearson et al. |
| 2003/0061370 | A1 | 3/2003 | Nakayama et al. |
| 2004/0136349 | A1 | 7/2004 | Walton et al. |
| 2004/0255048 | A1* | 12/2004 | Lev Ran ................. G06F 9/546 709/249 |
| 2005/0021848 | A1* | 1/2005 | Jorgenson ............... G06F 9/505 709/238 |
| 2005/0278389 | A1* | 12/2005 | Maze ................ G06F 17/30215 |
| 2006/0089997 | A1 | 4/2006 | Inokuchi |
| 2007/0038697 | A1* | 2/2007 | Zimran et al. ................ 709/203 |
| 2009/0320066 | A1 | 12/2009 | Soldan et al. |
| 2010/0017832 | A1 | 1/2010 | Wang |
| 2010/0134701 | A1 | 6/2010 | Eyer |
| 2010/0179987 | A1* | 7/2010 | Sebastian ............ H04L 12/1859 709/203 |
| 2010/0223436 | A1 | 9/2010 | Yamagishi et al. |
| 2010/0309387 | A1 | 12/2010 | Eyer |
| 2011/0001885 | A1 | 1/2011 | Eyer |
| 2011/0004907 | A1 | 1/2011 | Ryer |
| 2011/0004908 | A1 | 1/2011 | Eyer |
| 2011/0004910 | A1 | 1/2011 | Eyer |
| 2011/0016171 | A1 | 1/2011 | Kim et al. |
| 2012/0066733 | A1 | 3/2012 | Eyer |
| 2012/0216229 | A1 | 8/2012 | Eyer |
| 2012/0297436 | A1 | 11/2012 | Eyer |
| 2013/0268987 | A1 | 10/2013 | Eyer |
| 2013/0340021 | A1 | 12/2013 | Eyer |

FOREIGN PATENT DOCUMENTS

| | | | |
|---|---|---|---|
| EP | 1 865 721 A2 | | 12/2007 |
| EP | 2012501 | * | 1/2009 |
| JP | 11-249951 | | 9/1999 |
| JP | 2000-285057 | | 10/2000 |
| JP | 2002-123610 | | 5/2002 |
| JP | 2002-229861 | | 8/2002 |
| JP | 2002-229881 A | | 8/2002 |
| JP | 2002-229881 A | | 8/2002 |
| JP | 2003-032644 | | 1/2003 |
| JP | 2004-507988 A | | 3/2004 |
| JP | 2004-533759 | | 11/2004 |
| JP | 2007156842 | | 6/2007 |
| JP | 2009-540704 | | 11/2009 |
| JP | 2010-34893 A | | 2/2010 |
| JP | 2010-166339 A | | 7/2010 |
| JP | 2010-524271 A | | 7/2010 |
| JP | 2011-66556 A | | 3/2011 |
| RU | 2330381 | | 7/2008 |
| WO | WO 02/39699 | * | 5/2002 |

OTHER PUBLICATIONS

U.S. Appl. No. 13/071,551, filed Mar. 25, 2011, Kitazato, et al.
U.S. Appl. No. 13/081,566, filed Apr. 7, 2011, Kitazato, et al.
U.S. Appl. No. 13/107,604, filed May 13, 2011, Dewa.
U.S. Appl. No. 13/238,138, filed Sep. 21, 2011, Kitazato.
U.S. Appl. No. 13/238,264, filed Sep. 21, 2011, Kitazato.
U.S. Appl. No. 13/238,080, filed Sep. 21, 2011, Kitazato, et al.
U.S. Appl. No. 13/238,277, filed Sep. 21, 2011, Kitazato.
U.S. Appl. No. 13/239,871, filed Sep. 22, 2011, Kitazato.
U.S. Appl. No. 13/238,065, filed Sep. 21, 2011, Kitazato.
U.S. Appl. No. 13/220,231, filed Aug. 29, 2011, Kitahara, et al.
U.S. Appl. No. 13/075,440, filed Mar. 30, 2011, Yamagishi, et al.
U.S. Appl. No. 13/071,238, filed Mar. 24, 2011, Yamagishi, et al.
U.S. Appl. No. 13/071,559, filed Mar. 25, 2011, Yamagishi, et al.
U.S. Appl. No. 13/071,560, filed Mar. 25, 2011, Yamagishi, et al.
International Search Report dated Oct. 4, 2011 in Application No. PCT/JP2011/068835.
Extended European Search Report dated Mar. 13, 2014, in European Patent Application No. 11821563.9.
Notice of Reasons for Rejection dated Mar. 16, 2017 in Japanese Patent Application No. 2016-050376 (with English translation).

* cited by examiner

FIG. 7

| Item | No. of Bits | Explanation |
|---|---|---|
| Trigger_id | 8 | Identify Trigger with same function. |
| Protocol_version | 8 | Set to 0 currently |
| Command_code | 8 | In this case, it indicates "execute" command. |
| App_id | 24 | Application identifier this command target |
| App_type | 4 | Application type (for example HTML5) |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a sever |
| App_expire_date | 32 | Passing over it, Application shall be terminated if Terminated Command is not issued. |

FIG. 8

| Item | No. of Bits | Explanation |
|---|---|---|
| Trigger_id | 8 | Identify Trigger with same function. |
| Protocol_version | 8 | Set to 0 currently |
| Command_code | 8 | In this case, it indicates "inject event" command. |
| App_id | 24 | Application identifier this command target |
| App_type | 4 | Application type (for example HTML5) |
| Event_id | 8 | The corresponding event which described in script of the targeted Application shall be fired immediately. |
| Event Embedded Data | N | It is free format data injected into Application along with event. |

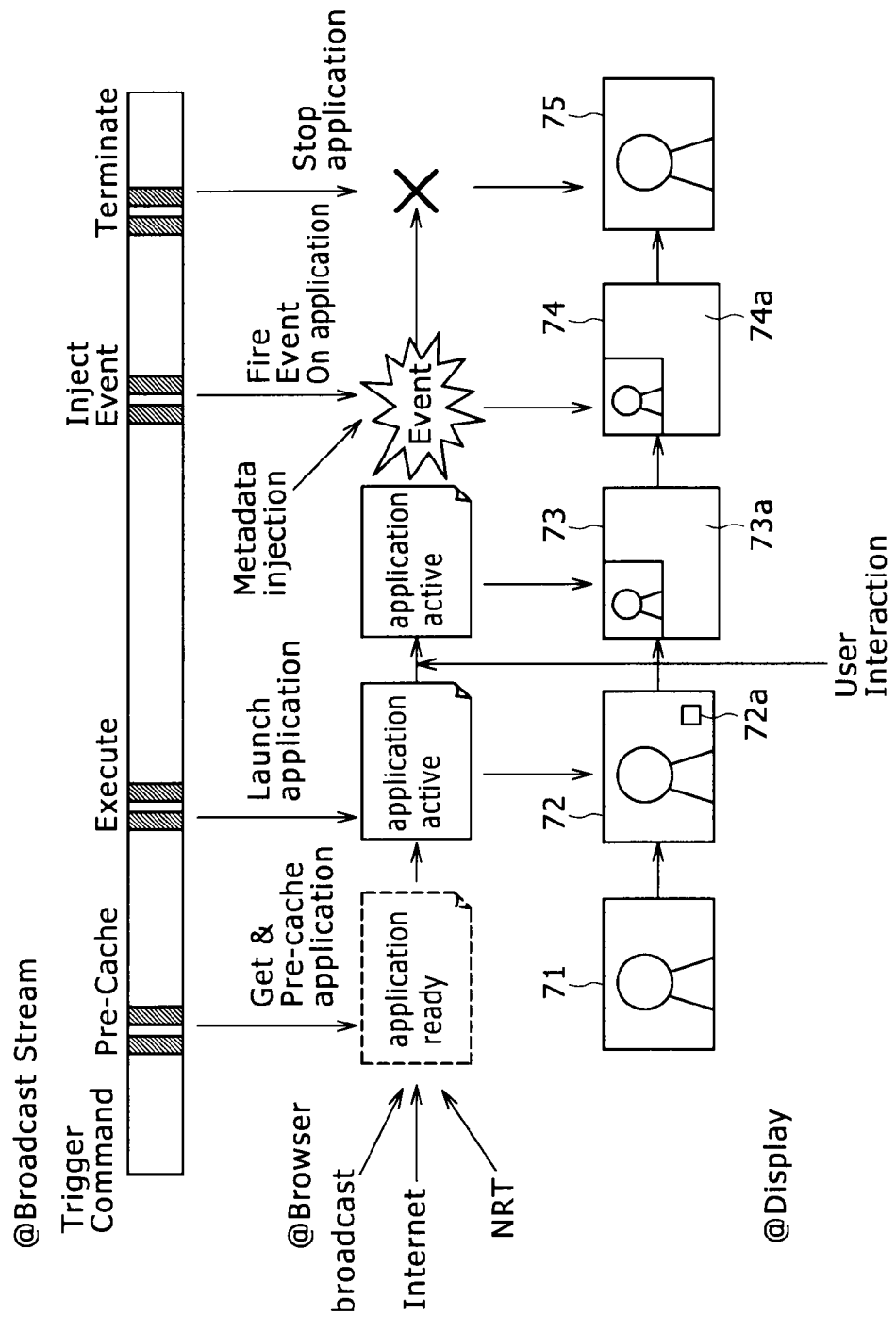

FIG.19

```
<?xml version="1.0" encoding="UTF-8"?>
<FDT-Instance xmlns:xsi="http://www.w3.org/2001/XMLSchema-instance"
    xmlns:fl="http://www.example.com./flute"
    xsi:schemaLocation="http://www.example.com/flute-fdt.xsd" Expires="2890842807">
    <File
    Location="http://www.example.com/menu/tracklist.html"
    TOI="1"
    Content-id="0x6784bf35"
    File-id="1"
    Type="text/html"/>
    <File
    Location="http://www.example.com/tracks/track1.mp3"
    TOI="2"
    Length="6100"
    Content-id="0x6784bf35"
    File-id="3"
    Type="audio/mp3"/>
</FDT-Instance>
```

151 (second <File ... Type="text/html"/> block)
152 (third <File ... Type="audio/mp3"/> block)

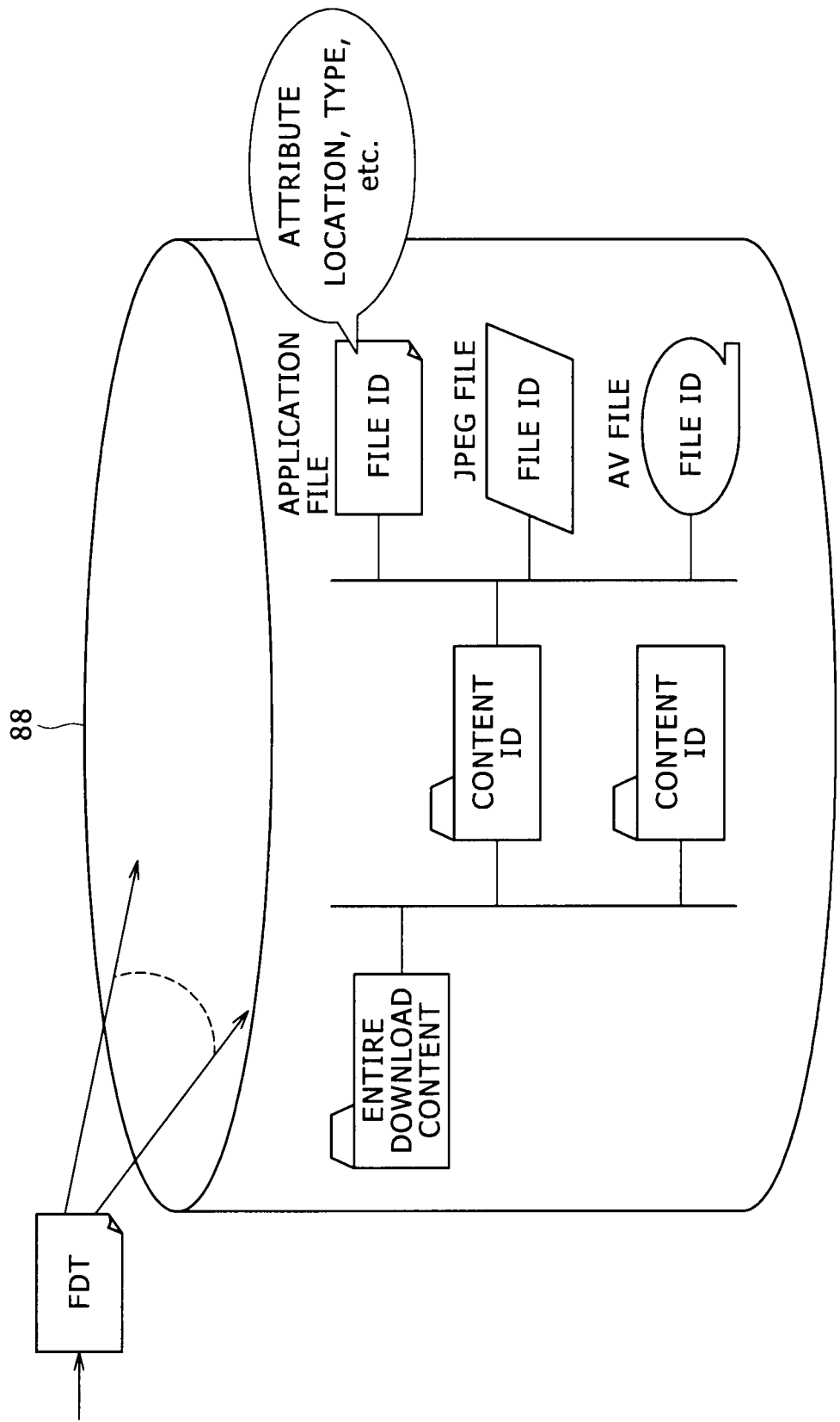

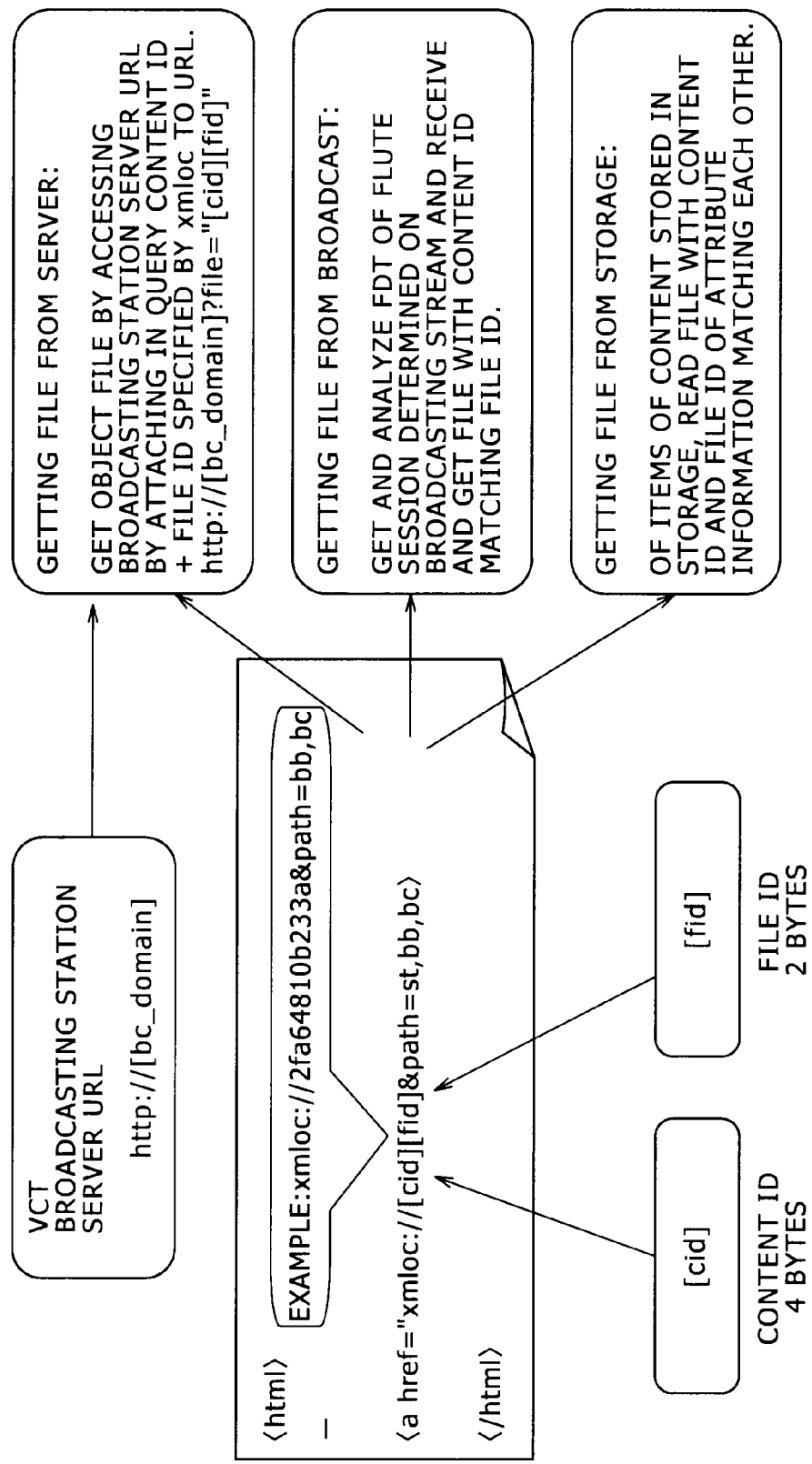

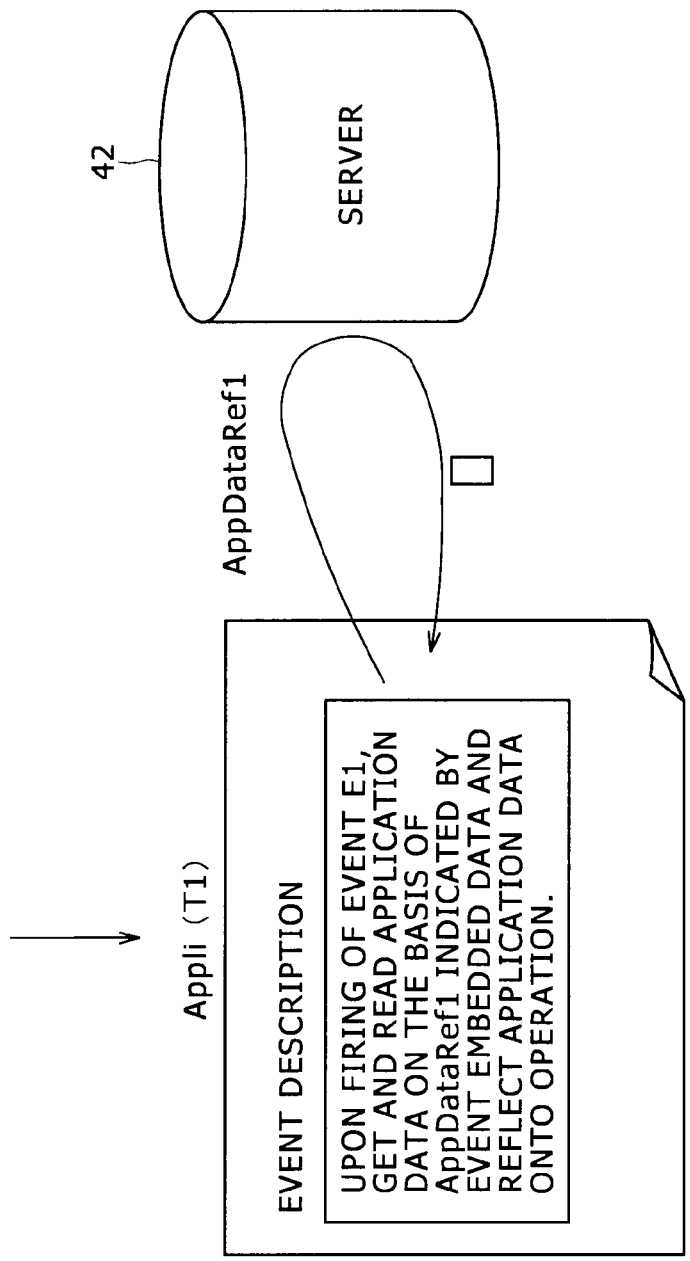

FIG. 25

TRIGGER SIGNAL 74b

| Command_code | App_id | Event_id | Event Embedded Data |
|---|---|---|---|
| inject event | T1 | E1 | AppDataRef1 xmloc://[cid][fid]&path =(st.)(bb.)(bc.) |

GETTING FILE FROM SERVER:
GET OBJECT FILE BY ACCESSING BROADCASTING STATION SERVER URL BY ATTACHING IN QUERY CONTENT ID + FILE ID SPECIFIED BY xmloc. http://[bc_domain]?file="[cid][fid]"

GETTING FILE FROM BROADCAST:
GET AND ANALYZE FDT OF FLUTE SESSION DETERMINED ON BROADCAST STREAM AND RECEIVE AND GET FILE WITH CONTENT ID MATCHING FILE ID.

GETTING FILE FROM STORAGE:
OF STORED ITEMS OF CONTENT, READ FILE WITH CONTENT ID AND FILE ID OF ATTRIBUTE INFORMATION MATCHING EACH OTHER.

Appli (T1)

EVENT DESCRIPTION
UPON FIRING OF EVENT E1, EXECUTE LOCATION SOLUTION ON THE BASIS OF AppDataRef1 INDICATED IN EVENT EMBEDDED DATA AND GET AND READ APPLICATION DATA FROM BROADCAST, COMMUNICATION, OR STORAGE TO REFLECT APPLICATION DATA ONTO OPERATION.

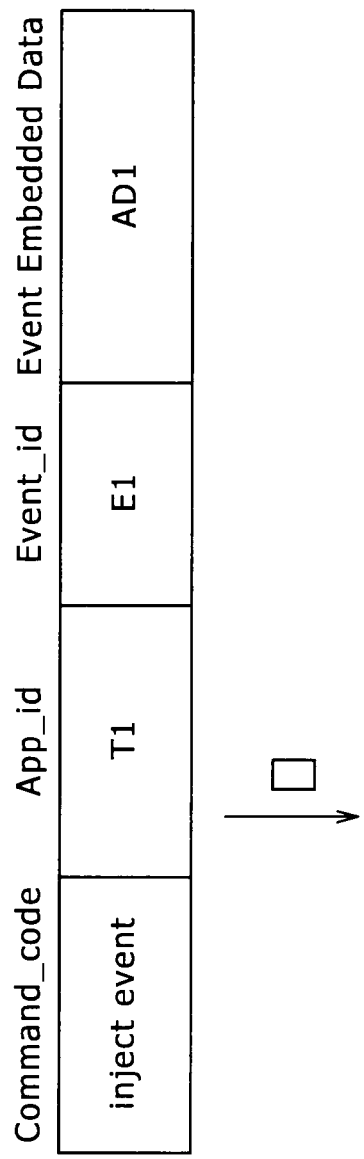

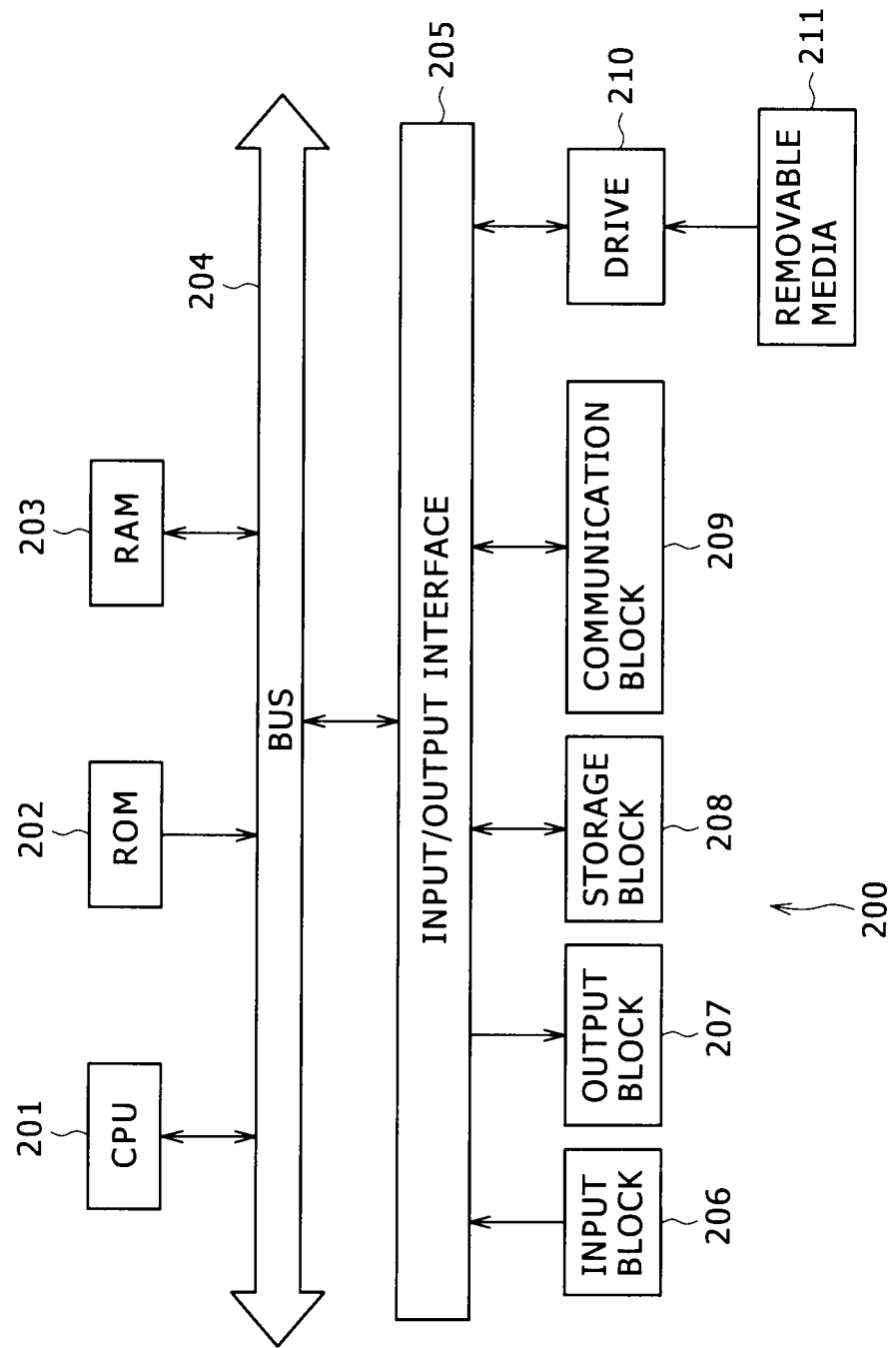

RECEPTION APPARATUS, RECEPTION METHOD, TRANSMISSION APPARATUS, TRANSMISSION METHOD, PROGRAM, AND BROADCASTING SYSTEM

CROSS REFERENCE TO RELATED APPLICATION

This application claims the benefit of priority of Provisional Application Ser. Nos. 61/378,239, filed Aug. 30, 2010 and 61/383,244, filed Sep. 15, 2010 the entire contents of each of which are incorporated herein by reference

BACKGROUND OF THE INVENTION

1. Field of the Invention

The present invention relates to a reception apparatus, a reception method, a transmission apparatus, a transmission method, a program, and a broadcasting system and, more particularly, to a reception apparatus, a reception method, a transmission apparatus, a transmission method, a program, and a broadcasting system that are configured to get a same file by common use of a name space indicative of a file storage location regardless of a file acquisition source, for example.

2. Description of the Related Art

Getting (or reading) files from a recording media, such as a hard disk drive incorporated in a computer, for example, requires the specification of a file to be obtained from among the files stored in the recording media in related art. In this case, a file to be obtained is specified by a name space "file://<directory_name>/<file_name>" indicative of the storage location of the file by a character string.

Getting files from a server connected to the Internet, for example requires the specification of a file to be obtained from among the files stored in the server. In this case, a file to be obtained is specified by a name space "http://<domain_name>/<file_name>," for example.

Further, getting files from digital television broadcast signals broadcast by digital television broadcasting, for example, requires the specification of a file to be obtained from among the files stored in digital television broadcast signals. In this case, a file to be obtained is specified by a name space "arib://<network_id>.<org_ts_id>.<service_id>/<component_tag>/<module_id>/<file_name>" for example.

As described above, related-art techniques require the use of different name spaces depending on file acquisition sources, thereby complicating file acquisition processing.

In order to solve this problem, a file ID reference technique as proposed (refer to Japanese Patent Laid-open No. 2002-229881, for example) in which, by relating a file ID with each of different name spaces, this file ID being the unique identification of each of different name spaces, a desired file can be specified only by specifying the file ID thereof regardless of the source from which the file is obtained.

In this file ID reference technique, when a file ID corresponding to the name space of a file stored in a file server 13 in terminal 11 is specified, the terminal 11 requests a location solution server 12 to notify the terminal 11 of the name space corresponding to the specified file ID.

In response to the request from the terminal 11, the location solution server 12 notifies the terminal 11 of the name space of a file stored in the file server 13. Using the obtained name space, the terminal 11 gets the corresponding file from the file server 13. It should be noted that the location solution server 12 is supposed to hold a name space for each file ID.

SUMMARY OF THE INVENTION

In the above-mentioned file ID reference technique, the terminal 11 can specify a file only by the file ID thereof regardless of file acquisition source but must always execute complicated processing of accessing the location solution server 12 in getting a file subject to acquisition. This configuration unnecessarily complicates the operation of a communication system made up of the terminal 11, the location solution server 12, and the file server 13.

Therefore, the present invention addresses the above-identified and other problems associated with related-art methods and apparatuses and solves the addressed problems by providing a reception apparatus, a reception method, a transmission apparatus, a transmission method, a program, and a broadcasting system that are configured to get a file subject to acquisition by use of a same name space regardless of file acquisition source without executing the complicated processing.

In carrying out the invention and according to a first embodiment thereof, there is provided a reception apparatus for receiving data. This reception apparatus has determination means for determining an acquisition source of a file to be acquired by the reception apparatus in a predetermined sequence from among a two or more storage media in which the file is stored; acquisition means for acquiring the file from the acquisition source on the basis of file acquisition information for use in acquiring the file in the two or more storage media, the file acquisition information being common to the two or more storage media; and execution means for executing the acquired file.

In the above-mentioned reception apparatus, if the file cannot be acquired from the acquisition source by the acquisition means, the determination means newly determines the acquisition source in this sequence.

In the above-mentioned reception apparatus, of the two or more storage media including at least a server connected to the reception apparatus via a network as the storage media, the determination means determines the acquisition source in the sequence in which a priority of the server that is the acquisition source is lower than priorities of the other storage media.

In the above-mentioned reception apparatus, of the two or more storage media including at least a an accumulation storage block of the reception apparatus in which the file has already been accumulated, the determination means determines the acquisition source in the sequence in which a priority of the accumulation storage block that is the acquisition source is higher than the priorities of the other storage media.

In the above-mentioned reception apparatus, on the basis of acquisition source information indicative of the acquisition source, the determination means determines the acquisition source from among the two or more storage media.

In the above-mentioned reception apparatus, the acquisition means acquires the file from the acquisition source on the basis of the file acquisition information made up of content identification information for identifying content at least made up of the file and file identification information for identifying the file managed for the content.

In the above-mentioned reception apparatus, the acquisition means acquires the content from the acquisition source on the basis of the file acquisition information made up of content identification information for identifying content at least made up of the file and acquires the file to be executed from the acquired content.

In the above-mentioned reception apparatus, the two or more storage media include a server connected to the reception apparatus via a network as one of the two or more storage media and the acquisition means acquires the file from the acquisition source by use of a URL (Uniform Resource Locator) indicative of the position of the file stored in the server as the file acquisition information.

The above-mentioned reception apparatus further has extraction means for extracting a trigger signal at least including acquisition source information indicative of the acquisition source and the file acquisition information from the data. The determination means determines the acquisition source from the two or more storage media on the basis of the acquisition source information included in the extracted trigger signal. The acquisition means acquires the file from the acquisition source on the basis of the file acquisition information included in the extracted trigger signal.

The above-mentioned reception apparatus still further has extraction means for extracting the acquisition source information and the file acquisition information from a program to be executed at acquisition of the file, the program having the acquisition source information indicative of the acquisition source and the file acquisition information. The determination means determines the acquisition source from among the two or more storage media on the basis of the extracted acquisition source information. The acquisition means acquires the file from the acquisition source on the basis of the extracted file acquisition information.

In the above-mentioned reception apparatus, as a file to be acquired by the reception apparatus for receiving AV (Audio/Video) content, the determination means determines an acquisition source from which the file is acquired in a predetermined sequence from among the two or more storage media in which a file to be executed in conjugation with progress of the AV content is stored.

In carrying out the invention and according to the first embodiment thereof, there is provided a reception method for a reception apparatus for receiving data. This method has the steps of determining, from two or more storage media storing a file to be acquired by the reception apparatus, an acquisition source from which the file is acquired in a predetermined sequence; acquiring the file from the acquisition source on the basis of file acquisition information for use in acquiring the file in the storage media, the file acquisition information being common to the two or more storage media; and executing the acquired file.

In carrying out the invention and according to the first embodiment thereof, there is provided a first program for making a computer control a reception apparatus for receiving data. This program has the steps of determining, from two or more storage media storing a file to be acquired by the reception apparatus, an acquisition source from which the file is acquired in a predetermined sequence; acquiring the file from the acquisition source on the basis of file acquisition information for use in acquiring the file in the storage media, the file acquisition information being common to the two or more storage media; and executing the acquired file.

According to the first embodiment of the invention, the acquisition source from which the above-mentioned file is acquired is determined in a predetermined sequence from among two or more storage media in which the file to be obtained by the reception apparatus is stored. On the basis of the file acquisition information for acquiring the file in the storage media, this file acquisition information being common to the above-mentioned two or more storage media, the file is acquired from the acquisition source and the file thus acquired is executed.

In carrying out the invention and according to a second embodiment thereof, there is provided a transmission apparatus for transmitting AV content. This transmission apparatus has transmission means for storing, in the AV content, a trigger signal associated with a file for making a reception apparatus execute the AV content in conjugation of progress thereof and transmitting the AV content in which the trigger signal is stored. This trigger signal at least includes acquisition source information indicative of an acquisition source from which the file is acquired from among two or more storage media in which the file is stored and file acquisition information for acquiring the file from the storage media, the file acquisition information being common to the two or more storage media.

In the above-mentioned transmission apparatus, the trigger signal includes the file acquisition information at least made up of content identification information for identifying content made up of the file and the acquisition source information.

In the above-mentioned transmission apparatus, the trigger signal includes content identification information for identifying content at least made up of the file, the file acquisition information made up of file identification information for identifying the file managed for the content, and the acquisition source information.

In the above-mentioned transmission apparatus, the two or more storage media include a server connected to the reception apparatus via a network as the storage media and the trigger signal includes a URL indicative of a location of the file stored in the server as the file acquisition information.

In carrying out the invention and according to the second embodiment thereof, there is provided a transmission method for a transmission apparatus for transmitting AV content. This transmission method has the steps storing, in the AV content, a trigger signal associated with a file for making a reception apparatus execute the AV content in conjugation of progress thereof and transmitting the AV content in which the trigger signal is stored. This trigger signal at least includes acquisition source information indicative of an acquisition source from which the file is acquired from among two or more storage media in which the file is stored and file acquisition information for acquiring the file from the storage media, the file acquisition information being common to the two or more storage media.

In carrying out the invention and according to the second embodiment thereof, there is provided a second program for making a computer control a transmission apparatus for transmitting AV content. This program has the steps of: storing, in the AV content, a trigger signal associated with a file for making a reception apparatus execute the AV content in conjugation of progress thereof and transmitting the AV content in which the trigger signal is stored. This trigger signal includes at least acquisition source information indicative of an acquisition source from which the file is acquired from among two or more storage media in which the file is stored and file acquisition information for acquiring the file from the storage media, the file acquisition information being common to the two or more storage media.

According to the second embodiment of the invention, the trigger signal associated with a file to be executed by the reception apparatus in conjugation with the progress of the AV content is transmitted as stored in the AV content. It should be noted that this trigger signal includes at least acquisition source information indicative of an acquisition source from which the file is acquired from among two or more storage media in which the file is stored and file acquisition information for acquiring the file from the storage media, the file acquisition information being common to the two or more storage media.

In carrying out the invention and according to a third embodiment thereof, there is provided a broadcasting system. This broadcasting system has a transmission apparatus for transmitting AV content and a reception apparatus for receiving AV content. The transmission apparatus has transmission means for storing in the AV content, a trigger signal associated with a file for making a reception apparatus execute the AV content in conjugation with the progress thereof and transmitting the AV content in which the trigger signal is stored. This trigger signal at least includes acquisition source information indicative of an acquisition source from which the file is acquired from among two or more storage media in which the file is stored and file acquisition information for acquiring the file from the storage media, the file acquisition information being common to the two or more storage media. The reception apparatus has extraction means for extracting a trigger signal at least including acquisition source information and the file acquisition information from the AV content, determination means for determining the acquisition source from the two or more storage media on the basis of the acquisition source information included in the extracted trigger signal, acquisition means for acquiring the file from the acquisition source on the basis of the file acquisition information included in the extracted trigger signal, and execution means for executing the acquired file.

According to the third embodiment of the invention, the trigger signal associated with a file to be executed on the reception apparatus is transmitted by the transmission apparatus as stored in the AV content in conjugation with the progress of this AV content. This trigger signal at least includes acquisition source information indicative of an acquisition source from which the file is acquired from among two or more storage media in which the file is stored and file acquisition information for acquiring the file from the storage media, the file acquisition information being common to the two or more storage media. In addition, a trigger signal including at least the acquisition source information and the file acquisition information is extracted from the above-mentioned AV content by the reception apparatus. On the basis of the acquisition source information included in the extracted trigger signal, the acquisition source is determined from among the above-mentioned two or more storage media. On the basis of the file acquisition information included in the extracted trigger signal, the above-mentioned file is acquired from the determined acquisition source. Then, the acquired file is executed.

As described above and according to embodiments of the present invention, files to be acquired can be easily acquired by own by use of a same name space regardless of file acquisition sources without involving complicated processing.

BRIEF DESCRIPTION OF THE DRAWINGS

Other features and embodiments of the invention will become apparent from the following description of embodiments with reference to the accompanying drawings in which:

FIG. 7 is a diagram illustrating one example of items included in a trigger signal if a command code is application launch;

FIG. 8 is a diagram illustrating one example of items included in a trigger signal if a command code is an application event;

FIG. 10 is a diagram illustrating one example in which screen displays are changed on the basis of a trigger signal;

FIG. 19 is a diagram illustrating one example in which FDT is described in XML;

FIG. 20 is a diagram illustrating an exemplary storage for storing content and files in a hierarchical structure;

FIG. 21 is a schematic diagram illustrating another exemplary entry application file;

FIGS. 24A and 24B are diagrams illustrating a second example of an event that is executed when a trigger signal is received;

FIG. 25 is a diagram illustrating the acquisition of data from one of acquisition sources at the time of event execution;

FIGS. 26A and 26B are diagrams illustrating a third example of an event that is executed when a trigger signal is received; and FIG. 27 is a block diagram illustrating an exemplary configuration of a computer.

DETAILED DESCRIPTION OF THE PREFERRED EMBODIMENTS

This invention will be described in further detail by way of embodiments thereof with reference to the accompanying drawings.

(1) The First Embodiment
Exemplary Configuration of a Broadcasting System

Figure 1:
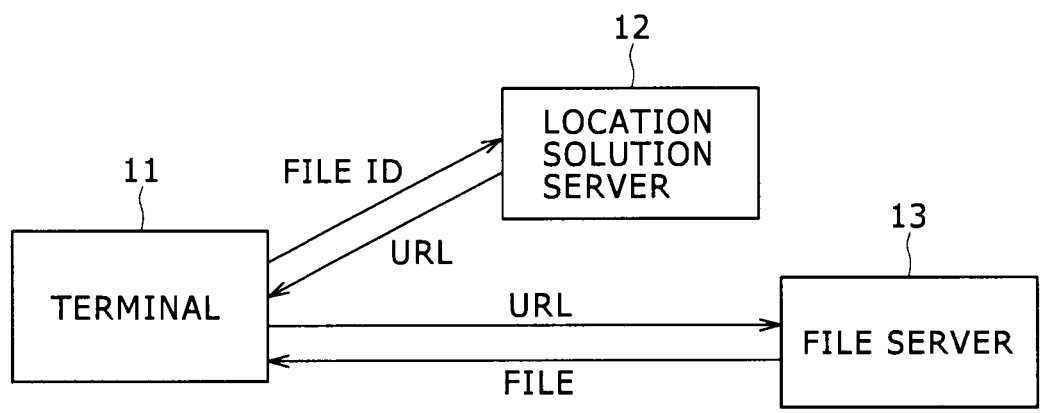
FIG. 1 is a schematic block diagram illustrating one example in which a related-art location solution server is used.
Figure 2:
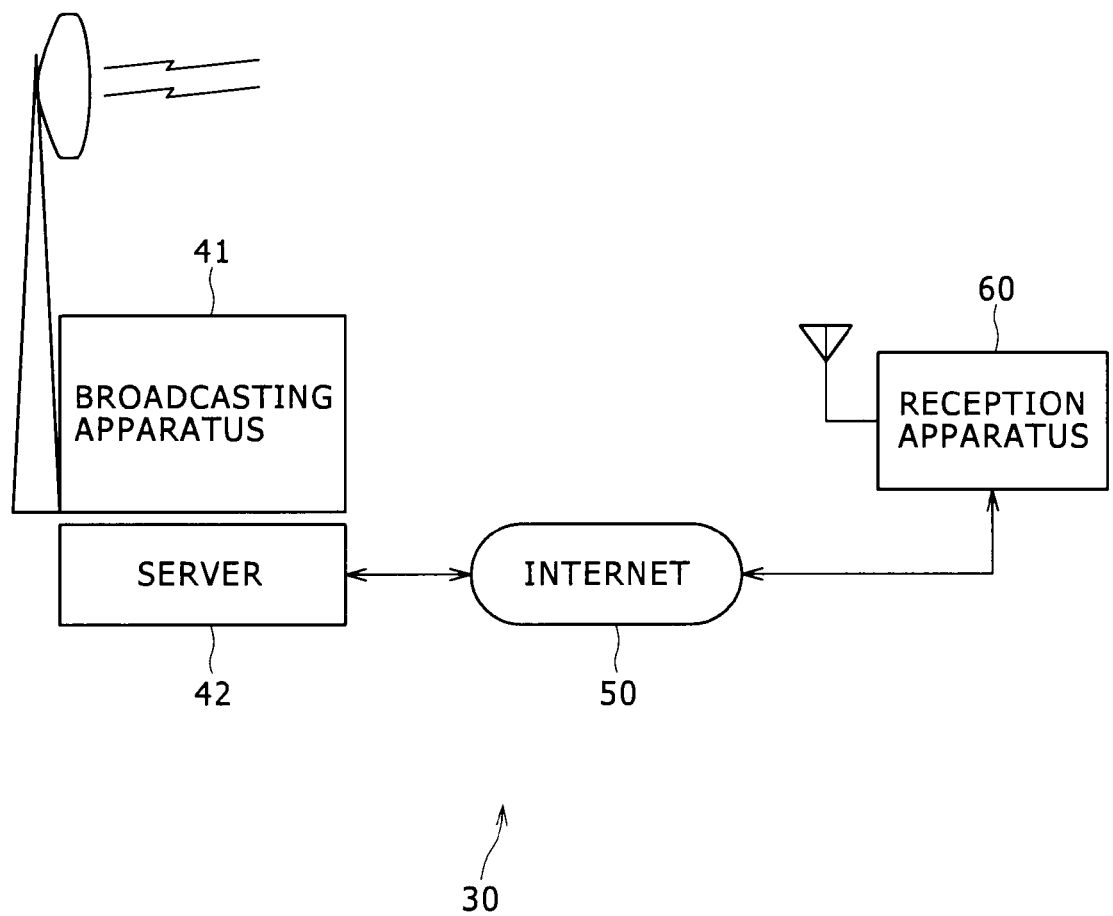
FIG. 2 is a schematic block diagram illustrating an exemplary configuration of a broadcasting system practiced as one embodiment of the invention.

Now, referring to FIG. 2, there is shown a broadcasting system 30 practiced as the first embodiment of the invention. The broadcasting system 30 is configured to get files by use of a same name space regardless of the source from which files are obtained in order to realize so-called data broadcasting services in the current USA, for example.

The broadcasting system 30 is configured by a broadcasting apparatus 41 and a server 42 installed at the broadcasting station side and a reception apparatus 60 installed at the receiver side.

The broadcasting apparatus 41 is configured to transmit (or broadcast) digital television broadcast signals. These digital television broadcast signals include AV content equivalent to television programs and data broadcast content equivalent to data broadcasting services.

AV content is configured by signals necessary for displaying television programs. Data broadcast content is configured by files necessary for realizing data broadcasting services. These will be described later with reference to FIG. 9.

With the broadcasting apparatus 41, a file transmission method called FLUTE is used for the transmission of data broadcast content. The file transmission method based on FLUTE will be described later with reference to FIGS. 15 through 19.

Further, the broadcasting apparatus 41 transmits, with a predetermined timing, a trigger signal by storing the trigger signal in a packet (hereafter referred to as a PCR packet) including PCR (Program Clock Reference) among TS packets making up TS (Transport Stream) of a digital television broadcast signal.

A trigger signal herein denotes a signal made up of information of data broadcast content execution timing and information of data broadcast content acquisition source, for example. Details of the trigger signal will be described later with reference to FIGS. 5 through 8.

It should be noted that, in addition to being stored in a PCR packet, the trigger signal may be embedded in a video signal itself corresponding to a digital television broadcast signal as a so-called watermark that is transparent to users.

Besides, if moving image composed of two or more pictures is broadcast as a digital television broadcast signal, for example, a trigger signal may be stored in a user-defined area defined for each picture (a user data of MPEG2 or the like for example).

If a trigger signal is transmitted as embedded in a video signal corresponding to a digital television broadcast signal, the trigger signal is extracted from the video signal at the reception apparatus 60. If a trigger signal is transmitted as stored in the user-defined area of each picture, the trigger signal is extracted from the user-defined area at the reception apparatus 60.

In what follows, it is assumed, for the convenience of description, that each trigger signal be transmitted as stored in a PCR packet to be extracted therefrom at the reception apparatus 60.

The server 42 supplies data broadcast content and so on in response to a request from the reception apparatus 60 that has accessed the server 42 via the Internet 50.

The reception apparatus 60 receives a digital television broadcast signal broadcast from the broadcasting apparatus 41, gets the video and audio signals of AV content equivalent to a television program, and outputs these video and audio signals.

Also, if data broadcast content is included in the received digital television broadcast signal, the reception apparatus 60 gets data broadcast content from the received digital television broadcast signal.

Further, the reception apparatus 60 accesses the server 42 via the Internet 50 to get data broadcast content.

Also, the reception apparatus 60 extracts the trigger signal from the PCR packet included in the received digital television broadcast signal and, on the basis of the extracted trigger signal, displays a video realized by the obtained data broadcast content onto a display monitor, not shown.

It should be noted that this reception apparatus 60 may either be a standalone unit or incorporated in a television receiver or a video recorder, for example. Details of the reception apparatus 60 will be described later with reference to FIG. 4.

Overview of the Present Invention

Figure 3:
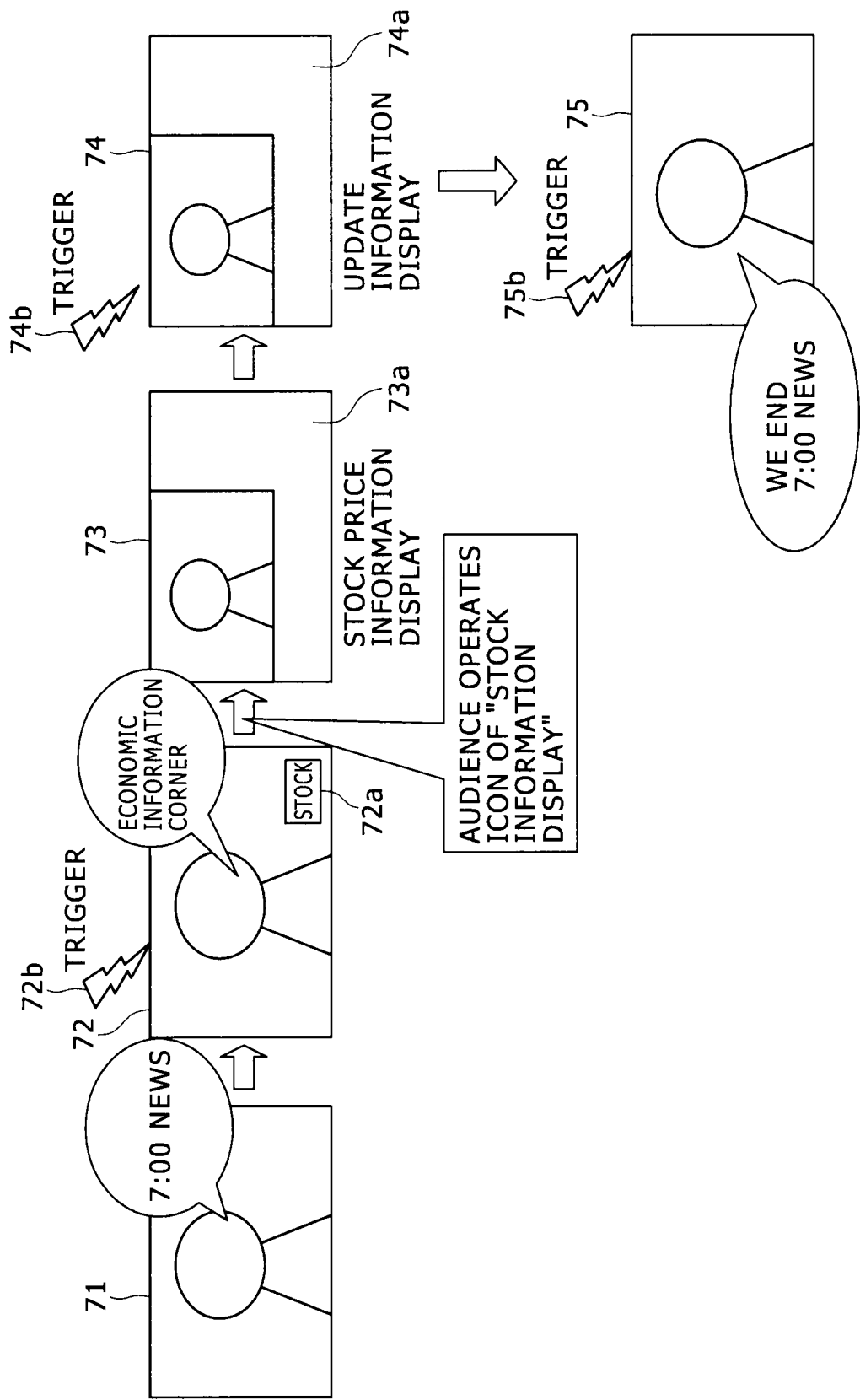
FIG. 3 is a diagram illustrating display examples of content for data broadcasting.

Now, referring to FIG. 3, there is shown an example in which, on the basis of a trigger signal received from the broadcasting apparatus 41, the reception apparatus 60 displays a video realized by data broadcast content onto a display monitor, not shown.

The reception apparatus 60 receives a digital television broadcast signal broadcast from the broadcasting apparatus 41, gets a video 71 of AV content from the received digital television broadcast signal, and displays the obtained video 71 onto the display monitor, not shown.

In response to the acquisition of a trigger signal 72b for displaying a stock price icon 72a that is selected for displaying stock price information, for example, from the PCR packet of the received digital television broadcast signal, the reception apparatus 60 displays a video 72 that includes the stock price icon 72a.

Next, in response to the execution by the use of a selection operation for selecting the stock price icon 72a, the reception apparatus 60 displays a video 73 that includes stock price information display 73a indicative of a current stock price.

If the reception apparatus 60 has obtained a trigger signal 74b for displaying most recent stock price information display 74a by updating the stock price information display 73a from the digital television broadcast signal that the reception apparatus 60 is receiving, the reception apparatus 60 updates the video 73 in display to a video 74 that includes a stock price information display 74a.

If the reception apparatus 60 gets a trigger signal 75b for stopping the stock price information display 74a from the digital television broadcast signal that the reception apparatus 60 is receiving, the reception apparatus 60 stops the stock price information display 74a and displays only a video 75 of the AV content.

In displaying the stock price icon 72a, the stock price information display 73a, and stock price information display 74a, the reception apparatus 60 gets a file (included in the data broadcast content) necessary for displaying these information items from any one of the digital television broadcast signal broadcast from the broadcasting apparatus 41, the server 42, and a storage 88 (FIG. 4) incorporated in the reception apparatus 60.

The point of the present invention is that, without executing complicated processing, the reception apparatus 60 can get files subject to acquisition by use of the same name space regardless of sources from which the files are obtained. Details thereof will be described later with reference to FIGS. 10 through 12, for example.

Exemplary Configuration of the Reception Apparatus 60

Figure 4:
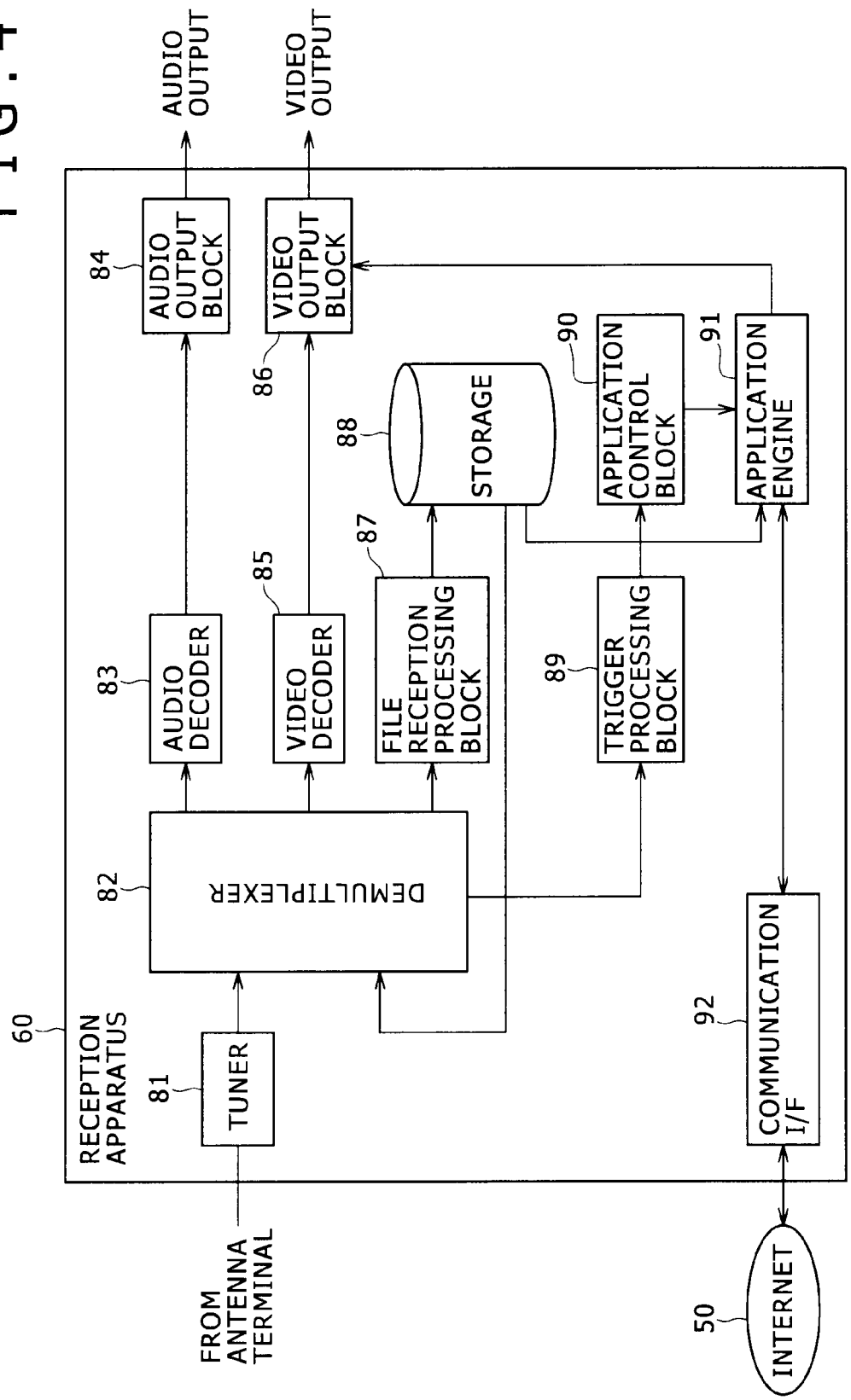
FIG. 4 is a block diagram illustrating an exemplary configuration of a reception apparatus.

Referring to FIG. 4, there is shown an exemplary configuration of the reception apparatus 60. The reception apparatus 60 has a tuner 81, a demultiplexer 82, an audio decoder 83, an audio output block 84, a video decoder 85, a video output block 86, a file reception processing block 87, the storage 88, a trigger processing block 89, an application control block 90, an application engine 91, and a communication I/F 92.

The tuner 81 receives a digital television broadcast signal corresponding to a channel selected by the user and demodulates the received signal, thereby outputting a TS obtained as a result thereof to the demultiplexer 82.

The demultiplexer 82 separates the TS entered from the tuner 81 into an audio coded signal and a video coded signal, thereby outputting the resultant audio coded signal and the resultant video coded signal to the audio decoder 83 and the video decoder 85, respectively.

In addition, the demultiplexer 82 extracts a PCR packet including a trigger signal arranged in the TS and output the extracted PCR packet to the trigger processing block 89.

It should be noted that, if the tuner 81 receives a digital television broadcast signal broadcast for download broadcasting and supplies a corresponding TS to the demultiplexer 82, the demultiplexer 82 supplies the TS for download broadcasting entered from the tuner 81 to the file reception processing block 87.

The file reception processing block 87 supplies the download broadcasting TS received from the demultiplexer 82 to the storage 88 for storing the TS therein.

Then, when the user operates an operator block, not shown, of the reception apparatus 60 so as to view the AV content corresponding to the digital television broadcast signal received in the download broadcasting, the corresponding AV content becomes ready for viewing.

To be more specific, in response to the user operation, the demultiplexer 82 reads the download broadcasting TS from the storage 88 and separates the TS into an audio coded signal and a video coded signal, outputting the resultant signals to the audio decoder 83 and the video decoder 85, respectively.

The audio decoder 83 decodes the entered audio coded signal and outputs a resultant audio signal to the audio output block 84. The audio output block 84 outputs the entered audio signal to the subsequent stage, the display monitor for example.

The video decoder 85 decodes the entered video coded signal and outputs a result video signal to the video output block 86. The video output block 86 outputs the video signal entered from the video decoder 85 to the subsequent stage, the display monitor for example. In addition, the video output block 86 combines the video of the data broadcast content entered from the application engine 91 and the video signal entered from the video decoder 85 and outputs a resultant signal to the subsequent stage. It should be noted that the outputting from the audio output block 84 and the video output block 86 is realized by use of a HDMI (High Definition Multimedia Interface) cable for example.

As described above, the file reception processing block 87 supplies the download broadcasting TS supplied from the demultiplexer 82 to the storage 88 to store the TS therein.

The storage 88 stores the download broadcasting TS and so on supplied from the file reception processing block 87.

To be more specific, the storage 88 stores, as the TS for download broadcasting, the AV content and data broadcast content included in the digital television broadcast signal broadcast for download broadcasting.

The trigger processing block 89 gets a trigger signal from the PCR packet received from the demultiplexer 82 and supplies the obtained trigger signal to the application control block 90.

On the basis of an operation signal and so on, for example, supplied from the operator block, not shown, the application control block 90 controls each of the functional blocks making up the reception apparatus 60. In addition, on the basis of a trigger signal entered from the trigger processing block 89, the application control block 90 controls the application engine 91 to execute acquisition, launching, event firing, and ending of an application program for data broadcasting (hereafter referred to as a data broadcasting application).

It should be noted that the application for data broadcasting or the data broadcasting application denotes a program for realizing services for the data broadcasting linked with television programs (for example, services for displaying stock price information, for example, in conjugation with a television program as shown in FIG. 3). The application for data broadcasting is included in data broadcast content as a file.

Under the control of the application control block 90, the application engine 91 gets the data broadcasting application from the server 42 via the communication I/F 92 and the Internet 50.

If the data broadcasting application has been stored in the storage 88 by download broadcasting, the application engine 91 gets the data broadcasting application from the storage 88.

Further, the application engine 91 gets the data broadcasting application from the digital television broadcast signal supplied from the application control block 90. It should be noted that the application engine 91 is supposed to be supplied, from the tuner 81, with the received digital television broadcast signal (or the TS thereof) via the demultiplexer 82, the trigger processing block 89, and the application control block 90.

Under the control of the application engine 91, the communication I/F 92 connects the reception apparatus 60 to the server 42 via the Internet 50.

Details of the Trigger Signal

Figure 5:
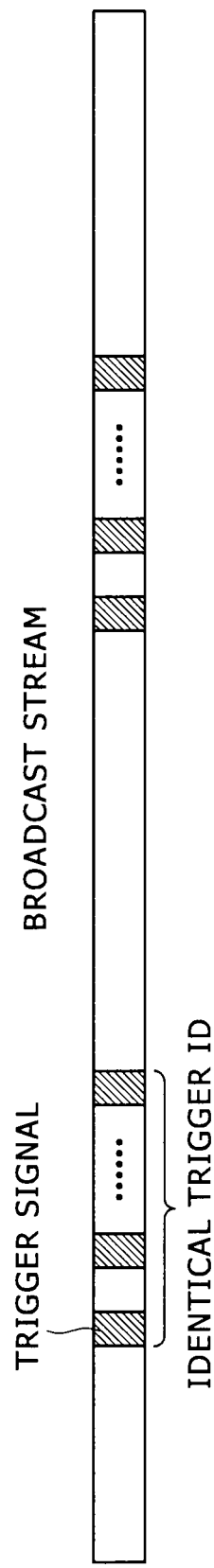
FIG. 5 is a conceptual diagram illustrating an example in which a trigger signal is transmitted as stored in a PCR packet of TS.

Referring to FIG. 5, there is shown a concept in which a trigger signal is transmitted as stored in a PCR packet of a TS. As shown in the figure, a trigger signal is not stored in each PCR packet; a trigger signal is stored in a PCR packet only when it is proper for linking with the AV content equivalent to a television program.

It should be noted that, depending on the contents of a trigger signal, trigger signals having the same content may be transmitted in consideration of a case where one trigger signal is not received by the reception apparatus 60 as shown in FIG. 5.

Figure 6:
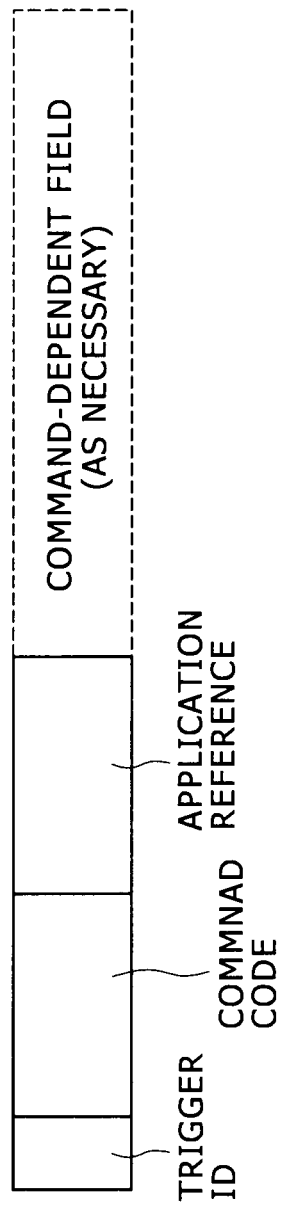
FIG. 6 is a diagram illustrating an exemplary configuration of a trigger signal.

Referring to FIG. 6, there is shown an exemplary configuration of a trigger signal.

As shown in FIG. 6, a trigger signal is configured by a trigger ID, a command code, and an application reference. It should be noted that a trigger signal is configured to have a command-dependent field as required.

A trigger ID is information for identifying a trigger signal to which this trigger ID is attached. If trigger signals having the same content are transmitted, the trigger IDs of these trigger signals are identical to each other. A command code is indicative of any one of the states of this trigger signal, namely, application launch (acquisition and launching of a data broadcasting application), application ending (ending of a data broadcasting application being executed), application event (firing of an event (updating of display contents, for example) in a data broadcasting application being executed), and pre-cache (only acquisition of a data broadcasting application). In this embodiment, four command codes are explained. However, they are merely examples and may be replaced by other command codes or other command codes may be added thereto.

An application reference is made up of an application ID and an acquisition source flag. A command-dependent field includes application type, application expiration date, event ID, protocol version, or data for execution, for example.

An application ID is information for identifying a data broadcasting application corresponding to this trigger signal and is represented by a common name space for example. An acquisition source flag is indicative of the acquisition source of the data broadcasting application to be obtained if the command code is trigger launching or pre-cache. To be more specific, the acquisition source flag includes a downloaded application flag indicative whether or not the storage 88 is the acquisition source, a broadcast application flag indicative whether or not a digital television broadcast signal is the acquisition source, and an Internet application flag indicative whether or not the location solution server 12 is the acquisition source, for example.

The downloaded application flag, the broadcast application flag, and the Internet application flag are each set to "0" or "1." If the flag is "1," it is indicative of the acquisition source; if the flag is "0," it is not indicative of the acquisition source. Details of the application ID and the acquisition source flags will be described later with reference to FIG. 11.

The application type is information indicative of the type (html or Java, for example) of the data broadcasting application corresponding to this trigger signal.

The application expiration date is information indicative of the time at which the data broadcasting application being executed is ended if the command code cannot get the trigger signal of application ending.

The event ID is information for identifying an event if the command code is application event. The protocol version is information indicative of the version of the format of this trigger signal. The data for execution is information for use in firing (or executing) an event, if the command code is application event. It should be noted that a trigger signal does not always include all the items mentioned above; a trigger signal includes only a necessary item or items depending on the timing and command code in the trigger signal.

Referring to FIG. 7, there is shown an example of items included in a trigger signal when the command code is application launch.

If the command code is application launch (execute), the trigger signal includes an 8-bit trigger ID (Trigger_id) and an 8-bit command code (Command_code) and, as application reference, a 24-bit application ID (App_id), a 1-bit downloaded application flag (Downloaded_App_flag), a 1-bit broadcast application flag (Broadcast_App_flag), and a 1-bit Internet application flag (Internet_App_flag), as shown in FIG. 7, for example.

In addition, the trigger signal includes as command-dependent field a 4-bit application type (App_type), an 8-bit protocol version (Protocol_version), and a 32-bit application expiration date (App_expire_date) as shown in FIG. 7.

It should be noted that, if the command code is pre-cache, the application reference includes a 24-bit application ID, a 1-bit downloaded application flag, a 1-bit broadcast application flag, and a 1-bit Internet application flag like the case where the command code is application launch.

Referring to FIG. 8, there is shown an example of items included in a trigger signal if the command code is application event.

If the command code is application event (inject event), a trigger signal includes an 8-bit trigger ID (Trigger_id) and an 8-bit command code (command_code) as shown in FIG. 8 for example. In addition, the trigger signal includes an 8-bit protocol version (Protocol_version), a 24-bit application ID (App_id), a 4-bit application type (App_type), an 8-bit event ID (Event_id), and N-bit execution data (Event Embedded Data), for example.

It should be noted that, with reference to FIGS. 9 through 22, examples will be described in which the command code is mainly application launch or pre-cache. With reference to FIGS. 23 through 26, examples will be described in which the command code is application event.

Referring to FIG. 9, there is shown an example in which content for data broadcasting for use in realizing services of AV content and data broadcast that are received by the reception apparatus 60 as digital television broadcast signal.

Figure 9A:
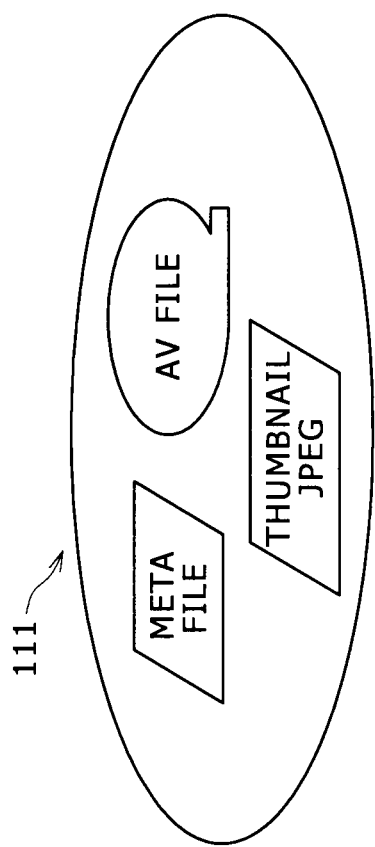
FIGS. 9A and 9B are diagrams illustrating exemplary AV content and data broadcast content.

AV content 111 shown in FIG. 9A is made up of two or more files. In this case, the AV content 111 is made up of an AV file representing video and audio corresponding to a television program, a meta file representing genre or so on of a television program, and a thumbnail JPEG representing a thumbnail of television programs, for example.

Figure 9B:
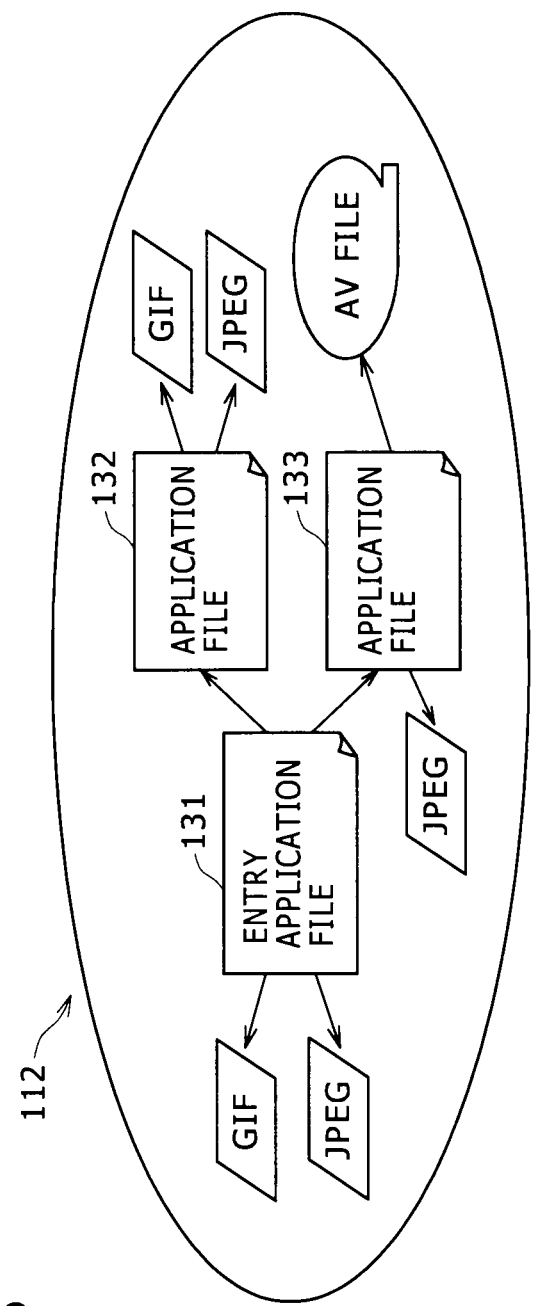

Data broadcast content 112 shown in FIG. 9B is made up of two or more files. In this case, the data broadcast content 112 is made up of an entry application file 131 that is executed first as a data broadcasting application in realizing data broadcast services, an application file 132 and an application file 133 that are referenced by the entry application file 131 to be executed, and a still image file (GIF or JPEG) and a moving image file (AV file) that are referenced by the entry application file 131, the application file 132, and the application file 133, for example.

Referring to FIG. 10, there is shown an example in which the reception apparatus 60 changes display screens as shown in FIG. 3 on the basis of a trigger signal.

As shown in FIG. 10, if a trigger signal with the command code being pre-cache is entered from the trigger processing block 89, the application control block 90 controls the application engine 91 to get the entry application file 131 (corresponding to the application shown in FIG. 10) of the data broadcast content 112 and pre-cache the entry application file 131.

Figure 11:
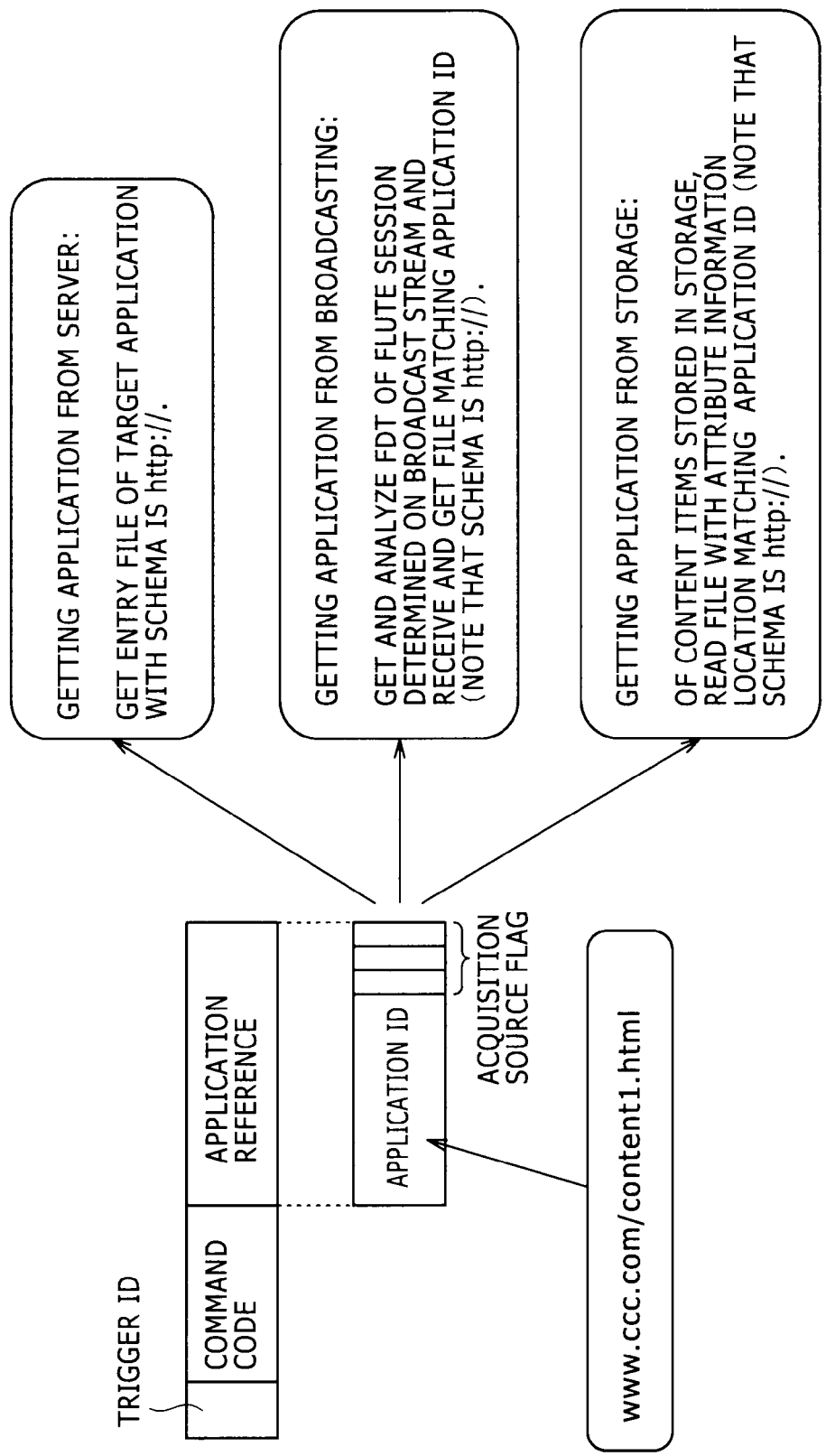
FIG. 11 is a diagram illustrating one example of items included in an application reference of a trigger signal.

To be more specific, as shown in FIG. 11, in addition to the trigger ID of this trigger signal and the command code indicative of pre-cache, this trigger signal includes the application ID and the acquisition source flags (in this case, three flags of broadcast application flag, Internet application flag, and downloaded application flag) as application reference, for example.

The application ID is indicative of a schema (a character string) "www.ccc.com/content1.html" representative of a common name space.

Therefore, on the basis of the acquisition source flag included in the trigger signal supplied from the trigger processing block 89, the application control block 90 determines the acquisition source of the entry application file 131 and notifies the application engine 91 thereof. Besides, the application control block 90 notifies the application engine 91 of URL "http://www.ccc.com/content1.html" that is obtained by attaching "http://" to the beginning of the schema.

Under the control of the application control block 90, the application engine 91 gets the entry application file 131 from the acquisition source indicated by the application control block 90 on the basis of URL "http://www.ccc.com/content1.html" indicated by the application control block 90 and pre-caches (stores) the entry application file 131 in an incorporated pre-cache memory for example.

It is assumed that the entry application file 131 be stored, as related with URL "http://www.ccc.com/content1.html" as a common name space, in at least one of the server 42, the digital television broadcast signal broadcast by the broadcasting apparatus 41 and the storage 88.

Further, as shown in FIG. 10, if a trigger signal with the command code indicative of application launch (Execute) is entered from the trigger processing block 89, the application control block 90 controls the application engine 91 to execute the pre-cached entry application file 131. Executing the entry application file 131, the application engine 91 generates the stock price icon 72a and supplies the generated icon to the video output block 86. The video output block 86 combines the stock price icon 72a with a video signal supplied from the video decoder 85 to display a video 72 including the stock price icon 72a as shown in FIG. 10. Then, in response to a user operation for selecting the stock price icon 72a, a video transition is subsequently executed on the display monitor, not shown, as described before with reference to FIG. 3.

Figure 12:
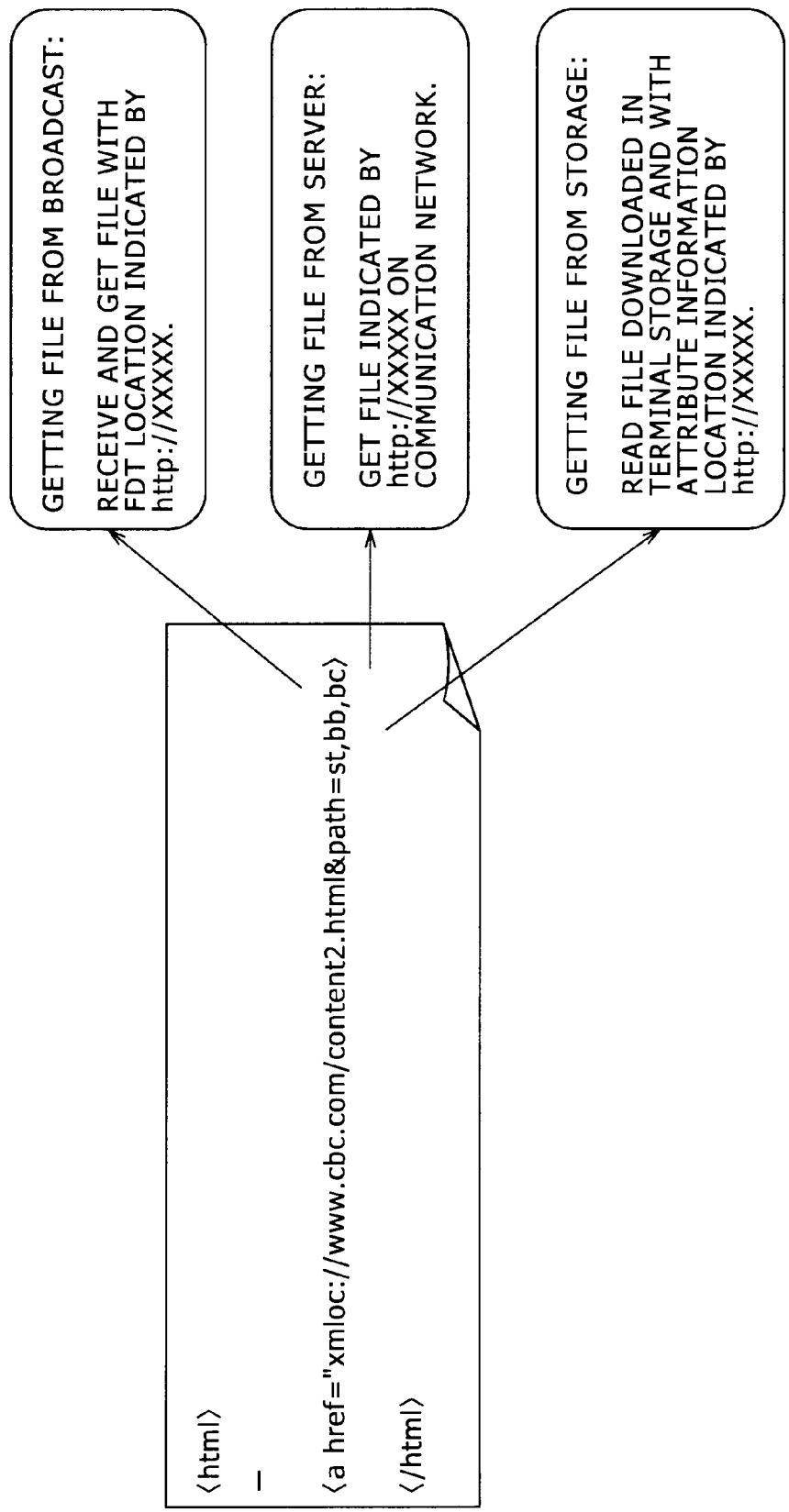
FIG. 12 is a diagram illustrating an exemplary entry application file.

Referring to FIG. 12, there is shown one example of a program configured to get a file that is executed to realize data broadcast services in conjugation with AV content.

To be more specific, FIG. 12 shows one example of the entry application file 131 as a program for acquisition, for example.

The entry application file 131 is an HTML (Hyper Text Markup Language) document, for example, describing <a href="xmloc://www.ccc.com/content2.html&path=st,bb,bc"> as an execution code for displaying the stock price icon 72a as shown in FIG. 12.

In the above-mentioned execution code, "xmloc://" is indicative that the HTML document "content2.html" specified by URL "http://www.ccc.com/content2.html" is obtainable from at least one of a digital television broadcast signal, the storage 88, and the server 42.

It should be noted that "&path=" is followed by "st (storage)" indicative of the storage 88, "bb (broadband)" indicative of the server 42 on the Internet 50, and "bc" "broadcast)" indicative of a digital television broadcast signal from the broadcasting apparatus 41 as the acquisition source of the HTML document "content2.html."

In the example shown in FIG. 12, "&path=st,bb,bc" is shown so that the HTML document "content2.html" is obtainable from any of the storage 88, the server 42 on the Internet 50, and a digital television broadcast signal.

To be more specific, if the application engine 91 executes <a href="xmloc://www.ccc.com/content2.html&path=st,bb,bc"> written in the HTML document shown in FIG. 12 to get the HTML document "content2.html" necessary for displaying the stock price icon 72a (for example, the HTML document for displaying a still-image file indicative of the stock price icon 72a), for example, the HTML document "content2.html" is obtained from any one of the storage 88, the server 42 on the Internet 50, and a digital television broadcast signal.

Because URL for example is used for the information for specifying an HTML document to be obtained as shown in FIG. 12, the HTML document to be obtained can be specified by the URL format regardless of the acquisition source of the HTML document.

Therefore, the HTML document to be obtained need not be specified by different formats for different acquisition sources, for example. Hence, as compared with the specification by use of different formats for different acquisition sources, the above-described novel configuration allows the easier description of the information for specifying an HTML document to be obtained in the case of the HTML document shown in FIG. 12.

Trigger Signal Responding Processing

The following describing trigger signal responding processing to be executed when the reception apparatus 60 receives a trigger signal.

Figure 13:
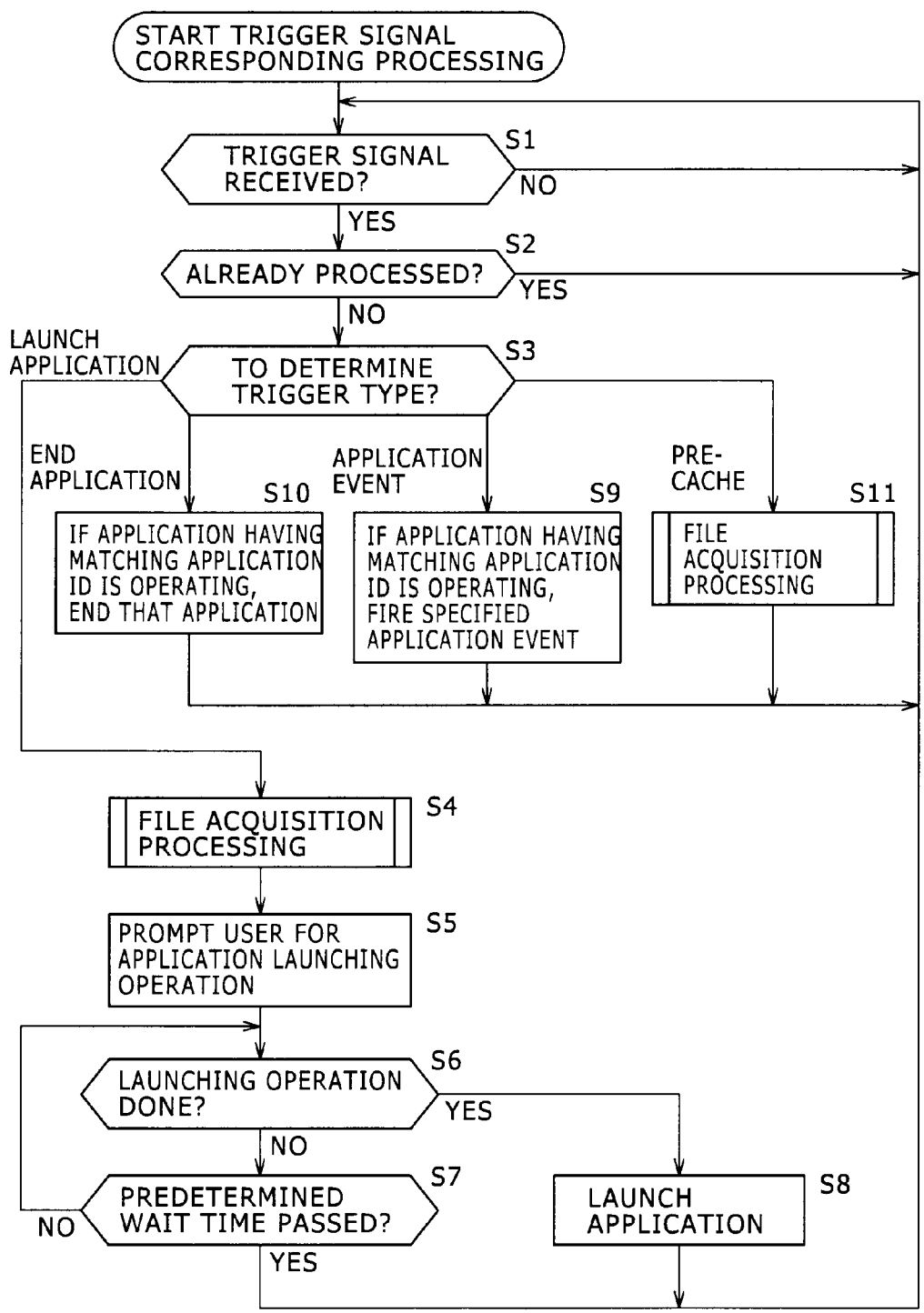
FIG. 13 is a flowchart indicative of trigger signal responding processing.

Referring to FIG. 13, there is shown a flowchart indicative of trigger signal responding processing. This trigger signal responding processing is repeatedly executed when the user is viewing a television program, namely, digital television broadcast signals are being received.

In step S1, the trigger processing block 89 waits until a PCR packet including a trigger signal is received on the basis of an input supplied from the demultiplexer 82. Next, when a PCR packet including a trigger signal has been received, the trigger processing block 89 gets the trigger signal from the received PCR packet and supplies the obtained trigger signal to the application control block 90, upon which the procedure goes to step S2.

In step S2, the application control block 90 determines on the basis of the trigger ID included in the trigger signal supplied from the trigger processing block 89 whether the processing of step S3 and subsequent steps has already been executed on the trigger signal supplied from the trigger processing block 89. If the processing of step S3 and subsequent steps is found already executed, the procedure is returned to step S1 to repeat the above-mentioned processing therefrom. By contrast, if the processing of step S3 and subsequent steps is found not yet executed, the procedure goes to step S3.

In step S3, the application control block 90 determines whether the command code of this trigger signal is any one of application launch, application event, application end, and pre-cache.

If the command code is found to be application launch in step S3, then the procedure goes to step S4.

In step S4, on the basis of the application ID and the acquisition source flag included in this trigger signal, the application control block 90 controls the application engine 91 to execute file acquisition processing for obtaining a data broadcasting application (for example, the entry application file 131 shown in FIG. 9) specified by the application ID from the acquisition source defined by the acquisition source flag. Details of the file acquisition processing will be described later with reference to the flowchart shown in FIG. 14.

If the application engine 91 has already obtained the data broadcast application and pre-cached the obtained application as in step S11 to be described later, the procedure skips the processing of step S4 and goes to step S5.

In step S5, under the control of the application control block 90, the application engine 91 prompts the user to execute an operation of launching a data broadcasting application (the entry application file 131 for example) by displaying enquiry "Do you want to execute the application?" for example. If a launching operation is found entered by the user in response to this prompt in step S6, then the procedure goes to step S8. In step S8, under the control of the application control block 90, the application engine 91 executes (launches) the data broadcasting application obtained in the file acquisition processing of step S4 or step S11. Consequently, a video 72 including the stock price icon 72a, for example, is displayed on the display monitor, not shown. Then, the procedure is returned to step S1 to repeat the above-mentioned processing therefrom.

It should be noted that, if the launching operation by the user is found not entered in step S6 after the prompting in step S5 and if a predetermined time has passed without the entry of the launching operation by the user, then the procedure is returned to step S1 to repeat the above-mentioned processing therefrom.

If the command code of this trigger signal is found to be application event in step S3, then the procedure goes to step S9. In step S9, the application control block 90 controls the application engine 91 only if there is a match between the application ID of this trigger signal and the application ID of the data broadcasting application in operation, thereby firing (executing) the event that corresponds to the event ID of the trigger signal in the data broadcasting application in operation. Then, the procedure is returned to step S1 to repeat the above-mentioned processing therefrom.

If the command code of this trigger signal is found to be application end in step S3, then the procedure goes to step S10. In step S10, the application control block 90 controls the application engine 91 only if there is a match between the application ID of this trigger signal and the application ID of the data broadcasting application in operation, thereby ending the data broadcasting application in operation. Then, the procedure is returned to step S1 to repeat the above-mentioned processing therefrom.

It should be noted that, even if a trigger signal with the command code indicative of application end has not been received, the data broadcasting application in operation is ended when the application expiration date written in the trigger signal with which the data broadcasting application in operation was launched is reached.

If the command code of this trigger signal is found to be pre-cache in step S3, then the procedure goes to step S11. In step S11, on the basis of the application ID and the acquisition source flag included in this trigger signal, the application control block 90 executes the file acquisition processing to be described with reference to FIG. 14. In addition, the application control block 90 stores the data broadcasting application obtained by the application engine 91 by the file acquisition processing into storage means, such as a cache memory incorporated in the application engine 91, for example. Then, the procedure is returned to step S1 to repeat the above-mentioned processing therefrom.

If the command code is pre-cache as in step S11, the data broadcasting application can be acquired prior to the broadcasting time of a television program to which the data broadcasting application is to be conjugated. Consequently, at the same time the television program to be conjugated is started, the corresponding data broadcasting application can be executed. Here, the description of the trigger signal responding processing ends.

Details of File Acquisition Processing

Figure 14:
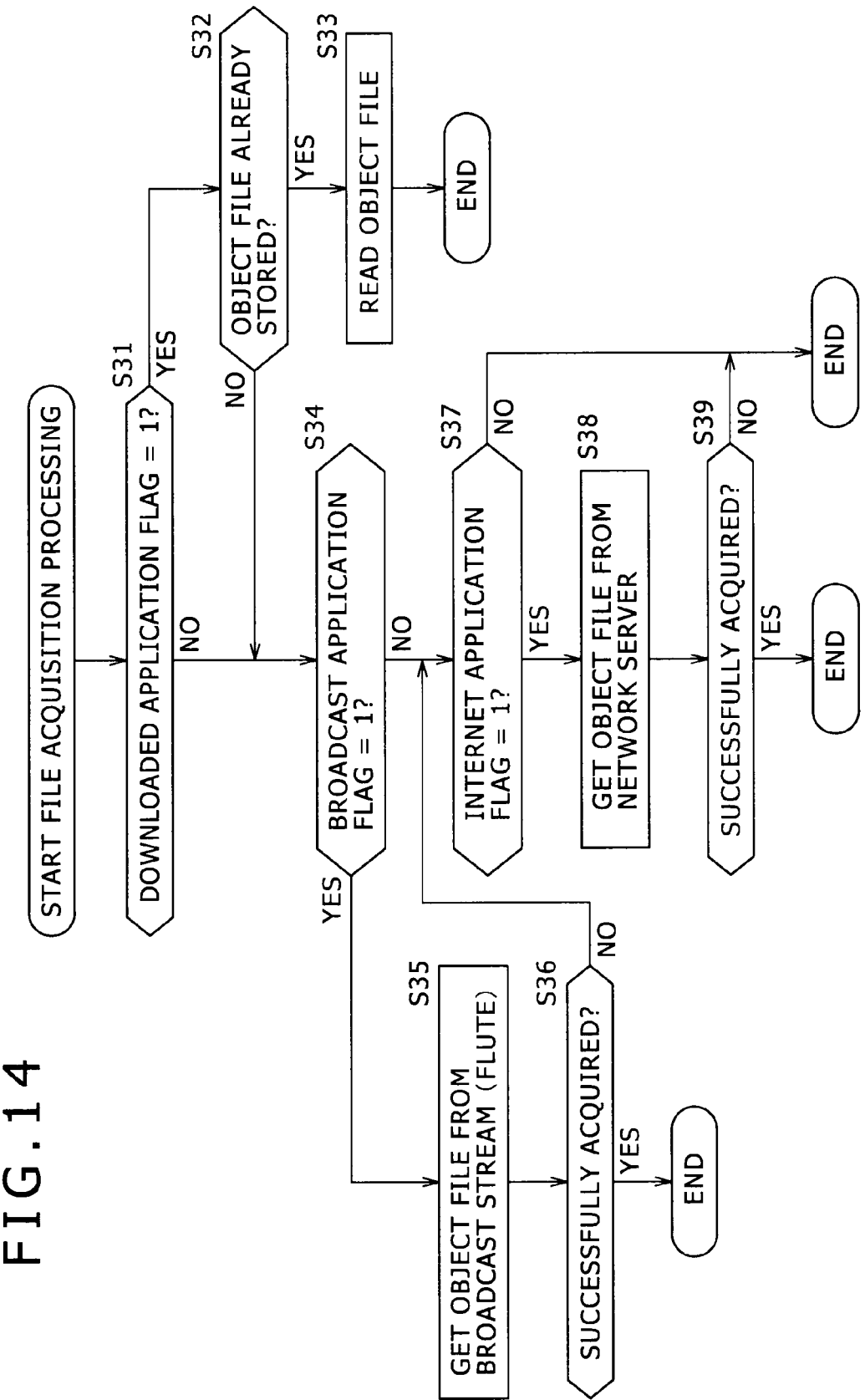
FIG. 14 is a flowchart indicative of file acquisition processing.

The following describes details of the file acquisition processing in step S4 or step S11 shown in FIG. 13 with reference to the flowchart shown in FIG. 14.

In step S31, the application control block 90 gets the application ID included in the application reference of a trigger signal supplied from the trigger processing block 89. In this case, the application ID is indicative of schema "www.ccc.com/content1.html" for specifying the file acquisition source as shown in FIG. 11, for example.

Then, the application control block 90 supplies URL "http://www.ccc.com/content1.html" obtained by attaching "http://" in front of schema "www.ccc.com/content1.html" as the obtained application ID to the application engine 91.

Also, in step S31, the application control block 90 gets the downloaded application flag from the plural acquisition source flags (downloaded application flag, Internet application flag, and broadcast application flag) included in the application reference of the trigger signal supplied from the trigger processing block 89. Then, the application control block 90 determines whether the obtained flag is "1" or not. If the obtained flag is found to be "1," then the application control block 90 notifies the application engine 91 of the storage 88 as the file acquisition source, upon which the procedure goes to step S32.

In step S32, the application engine 91 determines whether the file specified by the URL (in this case, "http://www.ccc.com/content1.html") supplied from the application control block 90 has already been stored in the file acquisition source notified by the application control block 90 (the storage 88, in this case).

If the object file is found already stored in the storage 88 that is the file acquisition source, the application engine 91 advances the procedure to step S33 and reads the object file from the storage 88, thereby ending the file acquisition processing. Then, the procedure is returned to step S4 or step S11 shown in FIG. 13.

If the application engine 91 determines in step S32 that the object file has not been stored in the storage 88 that is the file acquisition source, then the procedure goes to step S34. It should be noted that, if the application control block 90 determines in step S31 that the obtained downloaded application flag is not "1" (namely, the flag is "0"), the procedure also goes to step S34.

In step S34, the application control block 90 gets the broadcast application flag from the plural acquisition source flags included in the application reference of the trigger signal supplied from the trigger processing block 89. Next, the application control block 90 determines whether the obtained broadcast application flag is "1." If the obtained broadcast application flag is found to be "1," then the application control block 90 notifies the application engine 91 of the digital television broadcast signal as the file acquisition source, upon which the procedure goes to step S35.

In step S35, the application engine 91 attempts to get the object file specified by the URL supplied from the application control block 90 from the file acquisition source (in this case, the digital television broadcast signal) notified from the application control block 90. It is supposed here that the application engine 91 be supplied with the digital television broadcast signal via the tuner 81, the demultiplexer 82, the trigger processing block 89, and the application control block 90.

In step S36, the application engine 91 determines on the basis of the processing result obtained in step S35 whether the acquisition of the object file is successful or not. If the acquisition of the object file is found to be successful, then, the file acquisition processing comes to an end. Then, the procedure is returned to step S4 or step S11 shown in FIG. 13.

If the acquisition of the object file is found to be unsuccessful in step S36 on the basis the processing result obtained in step S35, then the procedure goes to step S37. It should be noted that, if the application control block 90 determined in step S34 that the obtained broadcast application flag is not "1" (namely, the flag is "0"), then the procedure also goes to step S37.

In step S37, the application control block 90 gets the Internet application flag from the plural acquisition source flags included in the application reference of the trigger signal supplied from the trigger processing block 89. Then, the application control block 90 determines whether the obtained Internet application flag is "1" or not. If the obtained Internet application flag is found to be "1," then the application control block 90 notifies the application engine 91 of the server 42 as the file acquisition source, upon which the procedure goes to step S38.

It should be noted that, at the current stage, attempts to get the object file from the storage 88 and the digital television broadcast signal have failed and therefore there remains only the server 42 for the acquisition source of the object file. Therefore, in the file acquisition processing, the processing of step S37 may be skipped to execute the processing of steps S38 and on.

In step S38, the application engine 91 attempts to get the object file specified by the URL supplied from the application control block 90 from the file acquisition source (in this case, the server 42) notified from the application control block 90.

In step S39, the application engine 91 determined on the basis of the processing result obtained in step S38 whether the acquisition of the object file is successful or not. If the acquisition of the object file is found to be successful, the file acquisition processing comes to an end. Subsequently, the procedure is returned to step S4 or step S11 shown in FIG. 13.

If the acquisition of the object file is found to be unsuccessful in step S39 on the basis of the processing result obtained in step S38, then the application engine 91 displays a message indicative of the unsuccessful acquisition onto a monitor or the like, not shown, thereby ending the file acquisition processing. Then, the processing is restarted from step S1 shown in FIG. 13.

It should be noted that, if the application control block 90 determines in step S37 that the obtained Internet application flag is not "1" (namely, the flag is "0"), the application control block 90 also displays a message indicative of the unsuccessful acquisition onto a monitor or the like, not shown, thereby ending the file acquisition processing. In this case, the processing is also restarted from step SI shown in FIG. 13.

As described above, according to the file acquisition processing, the file acquisition from the storage 88 is executed before the acquisition from the other acquisition sources (the digital television broadcast signal and the server 42), allowing the acquisition of an object file more quickly.

To be more specific, the storage 88 that allows the acquisition of an object file simply by reading from the storage 88 is preferentially designated as the acquisition source of an object file. Therefore, as compared with the acquisition of an object file by receiving a digital television broadcast signal and by accessing the server 42, an object file can be obtained more quickly from the storage 88.

In addition, the above-mentioned file acquisition processing is also configured to execute the acquisition from the storage 88 or a digital television broadcast signal before the acquisition from the server 42, for example. Therefore, such troubles can be avoided as a heavy concentration of requests to the server 42 for the acquisition of object files and the failure of the server 42 caused by the concentration.
Digital Television Broadcast Signal from the Broadcasting Apparatus 41

The following describes a digital television broadcast signal broadcast from the broadcasting apparatus 41 with reference to FIGS. 15 through 19.

Figure 15:
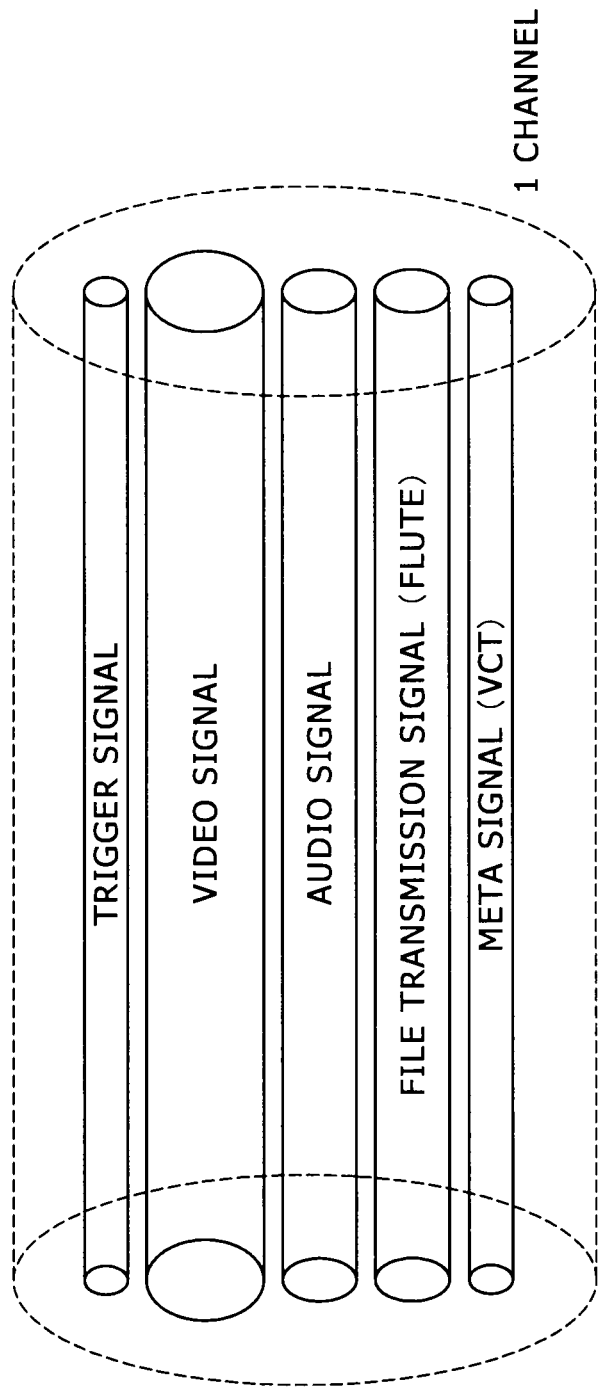
FIG. 15 is a schematic diagram illustrating an exemplary configuration of a digital television broadcast signal.

Referring to FIG. 15, there is shown an exemplary configuration of a digital television broadcast signal.

As shown in FIG. 15, a digital television broadcast signal is configured, for each channel, by a trigger signal, a video signal (corresponding to the video of AV content), an audio signal (corresponding to the audio of AV content), a file transmission signal including an object file to be obtained by the file acquisition processing, and a meta signal including VCT (Virtual Channel Table) for example as channel-associated control information.

Figure 16:
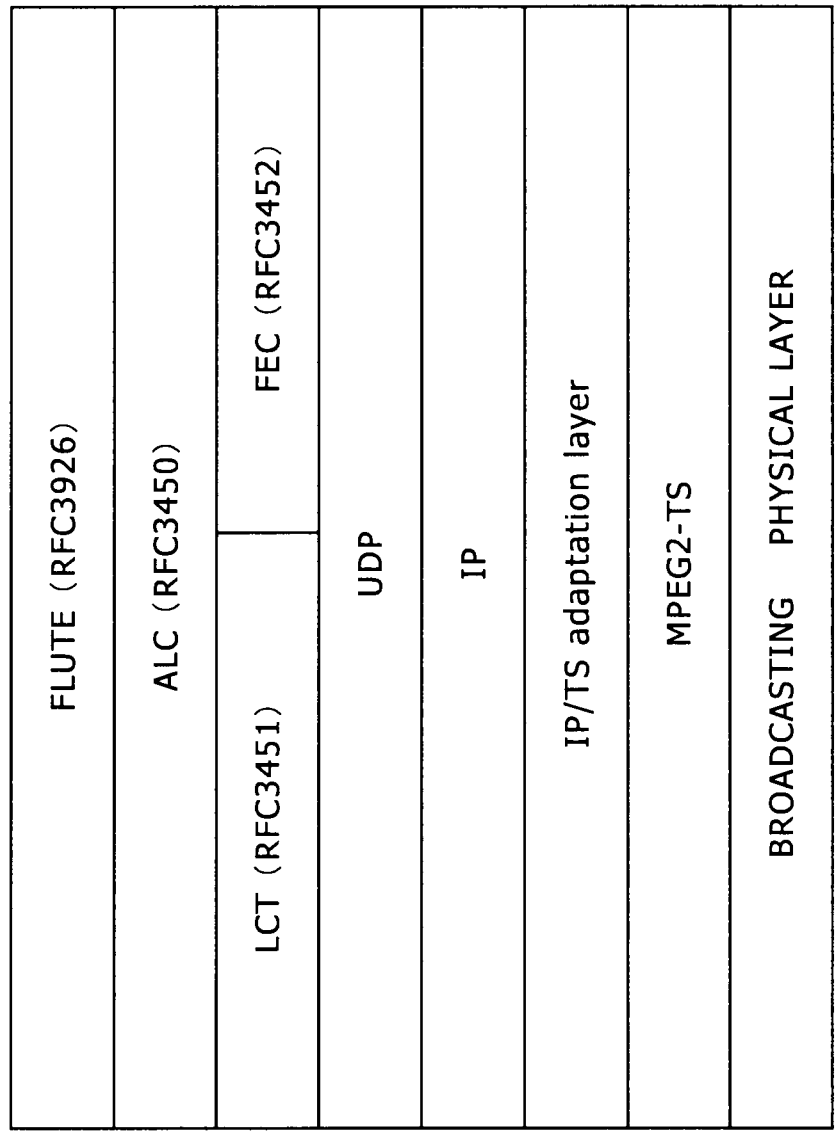
FIG. 16 is a diagram illustrating an exemplary file transmission protocol stack based on FLUTE.

It should be noted that a file transmission method based on FLUTE is used in each file transmission signal. Referring to FIG. 16, there is shown one example of this file transmission protocol stack based on FLUTE.

Figure 17:
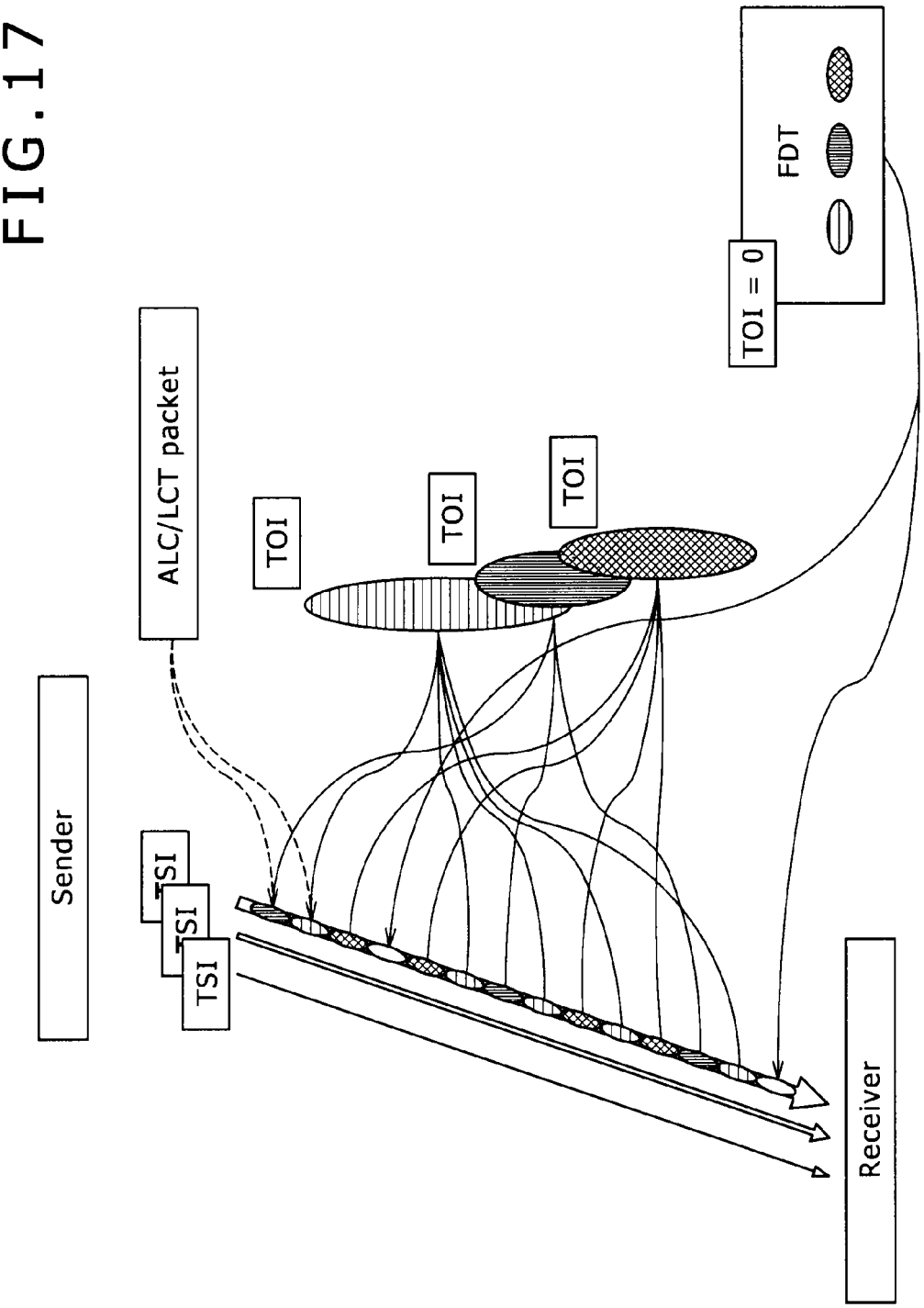
FIG. 17 is a diagram illustrating an exemplary file transmission method based on FLUTE.

Referring to FIG. 17, there is shown the file transmission method based on FLUTE.

FIG. 17 illustrates a data configuration of the content that is transmitted by a FLUTE session. The data obtained by the FLUTE session makes up FLUTE session streams shown at the left side of the figure.

Each FLUTE session stream is related with an identifier "TSI (Transport Session Identifier)" for identifying each FLUTE session. By identifier TSI, each session stream is identified.

Each FLUTE session stream is actually configured by two or more files each having a predetermined size. Each of these files has an identifier called TOI (Transport Object Identifier). This TOI allows the identification of each of the files. In this example, a file with "TOI"=0 is "FDT (File Delivery Table)," a file with "TOI"=1 is "FILE#1," a file with "TIO"=2 is "FILE#2," and so on.

It should be noted that each of the files is transmitted as an ALC (Asynchronous Layered Coding Protocol)/LCT (Layered Coding Transport (Building Block)) packet.

Figure 18:
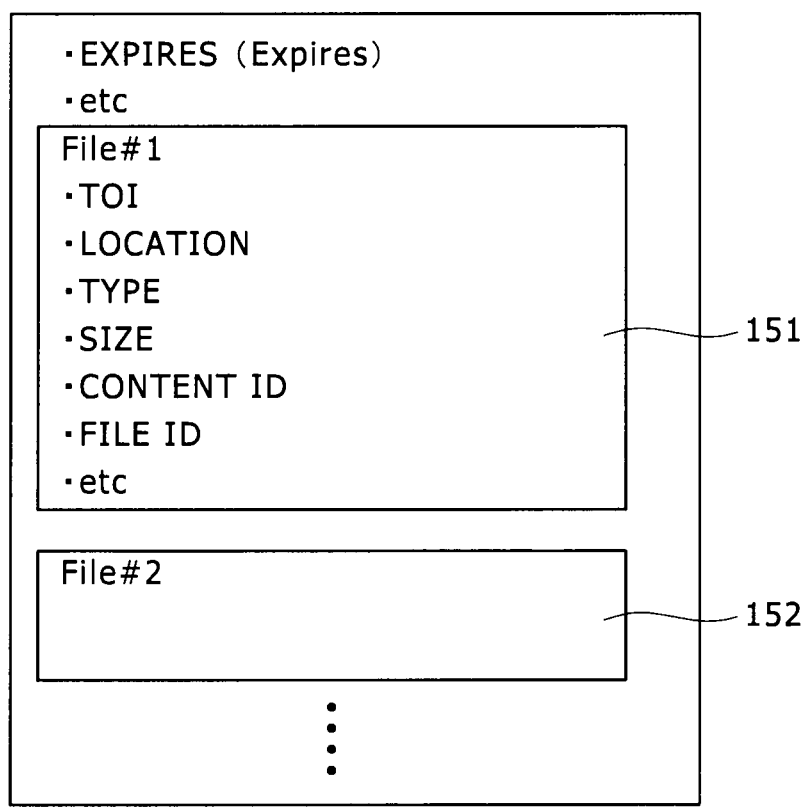
FIG. 18 is a schematic diagram illustrating an exemplary FDT.

Referring to FIG. 18, there is shown one example of "FDT" indicative of a file with "TOI"=0.

FDT has information associated with each of other files (files other than FDT) making up a FLUTE session stream.

To be more specific, FDT mainly has file information 151 associated with "FILE#1" in the FLUTE session, file information 152 associated with "FILE#2" in the FLUTE session, and so on, as shown in FIG. 18, for example.

The file information 151 includes "TOI" for "FILE#1," "location," "type," "size," "content ID," "file ID," and so on. It should be noted that "TOI" is information for identifying file "FILE#1" in the FLUTE session; actually, a predetermined value is written to "TOI."

In the file 151, "location" is indicative of the URL for example indicative of "FILE#1" and "type" is indicative of the file format (data type) of "FILE#1,"; if "FILE#1" is an image data file for example, "type" is "video" and, if "FILE#1" is audio data file, "type" is "audio."

Further, in the file information 151, "size" is indicative of the file size of "FILE#1," "content ID" is indicative of an identifier for uniquely identifying the content including "FILE#1," and "file ID" is indicative of an identifier for uniquely identify "FILE#1."

Because the file information 152 is substantially the same as the file information 151, the description of the file information 152 is skipped.

Referring to FIG. 19, there is shown one example in which FDT is written in XML (Extensible Markup Language).

In FIG. 19, as the file information 151 associated with "FILE#1" for example, "Location="http://www.example.com/menu/tracklist.html"" indicative of the location of "FILE#1" is written; "TOI="1"" indicative of TOI of "FILE#1" is written; "Content-id="0x6784bf35"" indicative of the content ID corresponding to "FILE#1" is written; "File-id="1"" indicative of the file ID of "FILE#1" is written; and "Type="text/html"/" indicative of the file type of "FILE#1" is written.

Also, as shown in FIG. 19, as the file information 151 associated with "FILE#2" for example, "Location="http://www.example.com/tracks/track1.mp3"" indicative of the location of "FILE#2" is written; "TOI="2"" indicative of TOI of "FILE#2" is written; "Length="6100"" indicative of the size of "FILE#2" is written; "Content-id="0x6784bf35"" indicative of the content ID corresponding to "FILE#2" is written; "File-id="3"" indicative of the file ID of "FILE#2" is written; and "Type="audio/mp3"" indicative of the file type of "FILE#2" is written.

When obtaining an object file from a digital television broadcast signal, the application engine 91 identifies the object file at the location matching the URL notified from the application control block 90 on the basis of the FDT transmitted (broadcast) by the file transmission method based on FLUTE, for example.

It should be noted that the file transmission method based on FLUTE is also used in the case of download broadcasting. When the reception apparatus 60 receives a digital television broadcast signal obtained from download broadcasting, files ("FILE#1," "FILE#2," and so on) corresponding to the ALC/LCT packet with TOI being 1 or more are stored in the storage 88 in hierarchical structure as shown in FIG. 20 for example on the basis of file "FDT" corresponding to the ALC/LCT packet of TOI=0. The FDT is also stored in the storage 88.

In getting an object file from the storage 88, the application engine 91 identifies the object file at the location matching the URL notified from the application control block 90 on the basis of the FDT stored in the storage 88.

Also, the file transmission method based on FLUTE assumes the download broadcasting for broadcasting a digital television broadcast signal stored on the storage 88 to be reproduced later and the realtime broadcasting for broadcasting a digital television broadcast signal for realtime use be executed at the same time. In this case, a session for download broadcasting and a session for realtime broadcasting are sessions that are separate from each other. To be more specific, these sessions are separated by setting the TSI of the realtime broadcasting session to a fixed value, such as 0 for example, and the TSI of the download broadcasting session to any value other than 0.

(2) The Second Embodiment

With the first embodiment described above, an object file is specified by use of URL as described with reference to FIG. 11 and FIG. 12. However, the present invention is not restricted to this configuration.

To be more specific, an object file may be specified by writing the file ID of the object file and the content ID of the content including the object file as shown in FIG. 21 instead of schema "www.ccc.com/content2.html" for example. In FIG. 21, the content ID is represented by four bytes and the file ID is represented by two bytes; however, the number of bytes for representing the content ID and the file ID is not restricted to this example. In FIG. 21, the content ID and the file ID are represented in a hexadecimal notation, such as "2fa64810b233a," for example.

In getting an object file from the server 42, the application engine 91 accesses URL "http://[bc_domain]?file="[cid][fid]"" to get the object file. It should be noted that [bc_domain] is indicative of the domain name of the server 42, [cid] is indicative of content ID, and [fid] is indicative of file ID.

URL "http://[bc_domain]" of the server 42 is included in VCT that is broadcast as a meta signal. Therefore, the application engine 91 extracts URL "http://[bc_domain]" of the server 42 from the broadcast VCT. Then, the application engine 91 accesses URL "http://[bc_domain]?file="[cid][fid]"" obtained on the basis of the extracted "http://[bc_domain]" and the content ID and the file ID written in the HTML document (the entry application file 131 for example) shown in FIG. 21, thereby getting the object file.

In getting an object file from a digital television broadcast signal, the application engine 91 gets the file corresponding to the content ID and the file ID written in the HTML document shown in FIG. 21 as the object file on the basis of the broadcast FDT.

In getting an object file from the storage 88, the application engine 91 gets (reads) the file corresponding to the content ID and the file ID written in the HTML document shown in FIG. 21 as the object file on the basis of the FDT stored in the storage 88.

As shown in FIG. 21, in the case where the content ID and the file ID are used, the second embodiment allows the specification of an object file with less bytes as compared with the first embodiment (in the case where "www.ccc.com/content2.html" is used), for example.

The content ID and the file ID are only character strings (in hexadecimal notation in the case of FIG. 21), for example. Therefore, even if a leakage takes place on the content ID or the file ID, there is no risk that the storage location of the object file is known from the leaked content ID or file ID.

It should be noted that FIG. 21 shows the specification of an object file on the basis of the content ID and the file ID written in an HTML document. This also holds the same with a trigger signal.

To be more specific, the application reference of a trigger signal may include a 4-byte content ID, a 2-byte file ID, and an acquisition source flag for specifying an object file.

It should be noted that a trigger signal is transmitted by digital television broadcasting or the like, so that it is desirable for the data volume of a trigger signal to be as small as possible.

Figure 22:
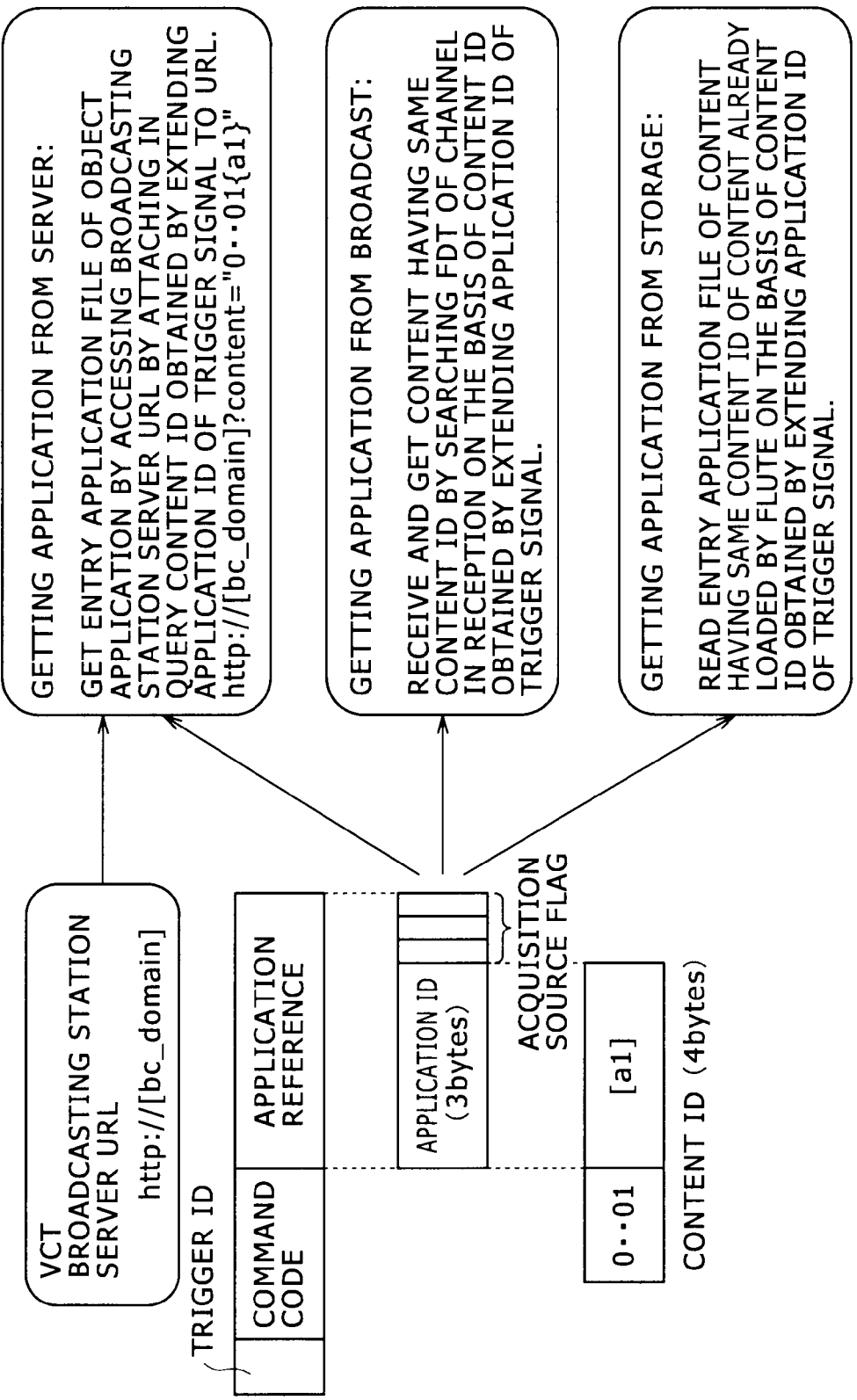
FIG. 22 is a diagram illustrating another example of items included in an application reference of a trigger signal.

Referring to FIG. 22, there is shown one example in which content including a file to be executed is specified to be obtained in a configuration in which a 3-byte application ID and an acquisition source flag are included in the application reference of a trigger signal.

In FIG. 22, the application ID is 3-byte identification information for simply identifying a data broadcast application in order to decrease the data volume of each trigger signal.

It should be noted that, unlike the application IDs shown in FIG. 7 and FIG. 11, the application ID shown in FIG. 22 is not configured to also represent schema "www.ccc.com/content1.html," so that this application ID can be represented only by three bytes that is smaller in data volume than 24-byte representation.

In specifying content by use of a trigger signal, the application control block 90 generates a content ID with the application ID included in the entered trigger signal set to the lower three bytes and the type information indicative of the type of the content to be obtained set to the upper one byte as shown in FIG. 22, supplying the generated content ID to the application engine 91.

It should be noted that, in this case, the content to be obtained on the basis of the received trigger signal is the content for use in data broadcasting and therefore is restricted to one type. Therefore, the type information of the content to be obtained in response to the reception of a trigger signal is common to all pieces of content.

Consequently, it is assumed that the application control block 90 hold the type information of the content to be obtained in response to the reception of a trigger signal, for example, in an incorporated memory, not shown, in advance.

In response to the reception of a trigger signal from the trigger processing block 89, for example, the application control block 90 extracts the application ID from the received trigger signal. Then, the application control block 90 generates a content ID with the extracted application ID set to the lower three bytes and the type information held in the incorporated memory set to the upper one byte and supplies the generated content ID to the application engine 91.

On the basis of the acquisition source flag included in the trigger signal supplied from the trigger processing block 89, the application control block 90 determines the acquisition source of the content specified by the generated content ID and notifies the application engine 91 of the determined acquisition source.

The application engine 91 gets the content having the same content ID as the content ID supplied from the application control block 90 from the acquisition source notified from the application control block 90 on the basis of the FDT and so on of the acquisition source.

It is assumed here that a content ID with the same type information as the type information held in the incorporated memory of the application control block 90 set to the upper one byte and the application ID set to the lower three bytes be written to the FDT broadcast by the broadcasting apparatus 41 and the FDT stored in the storage 88.

It is also assumed that a content ID with the same type information as the type information held in the incorporated memory of the application control block 90 set to the upper one byte and the application ID set to the lower three bytes be held in the server 42 as the content ID for identifying each piece of content for data broadcasting held in the server 42.

Therefore, if content is obtained from the server 42 for example, the application engine 91 accesses URL "http://[bc_domain]?content="0 . . . 01{a1}"" on the basis of the content ID supplied from the application control block 90, getting the corresponding content. In this URL, "0 . . . 01" is indicative of the type information stored in the upper one byte of the content ID supplied from the application control block 90. In this URL, "a1" is indicative of the application ID stored in the lower three bytes of the content ID supplied from the application control block 90. It is assumed here that the application engine 91 extract "http://[bc_domain]" from the VCT that is broadcast as a meta signal.

If content is obtained from a digital television broadcast signal for example, the application engine 91 gets, from the digital television broadcast signal, the content corresponding to the content ID ("0 . . . 01" "a1") supplied from the application control block 90 on the basis of the broadcast FDT.

Further, if content is obtained from the storage 88 for example, the application engine 91 gets, from the storage 88, the content corresponding to the content ID ("0 . . . 01" "a1") supplied from the application control block 90 on the basis of the FDT stored in the storage 88.

Then, the application engine 91 gets a predetermined file (the entry application file 131 shown in FIG. 9 for example) from the obtained content (the data broadcast content 112 shown in FIG. 9 for example).

To be more specific, the application engine 91 gets a file to be executed first among the files making up the obtained content. It is assumed, in this case, that the file to be executed first be attached with a file name ("index.html" for example) indicative of the file to be executed first. For this reason, on the basis of the file name of each of the files making up the obtained content, the application engine 91 gets the file to be executed first and executes this file.

In the first and second embodiments described above, if the command code is application launch or pre-cache, each data broadcast application is obtained by use of a common name space.

If the Command Code is Application Event

If the command code is application event, the data to be used at the execution of an event can be obtained by use of a common name space in substantially the same manner as described above.

The following describes one example in which the command code is application event with reference to FIG. 23A through FIG. 26B.

Figure 23A:
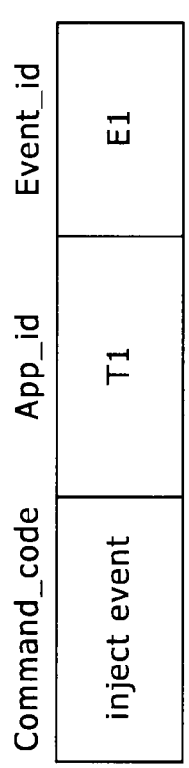
FIGS. 23A, 23B, and 23C are diagrams illustrating a first example of an event that is executed when a trigger signal is received.
Figure 23B:
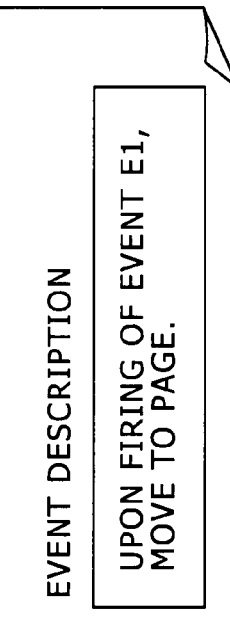
Figure 23C:
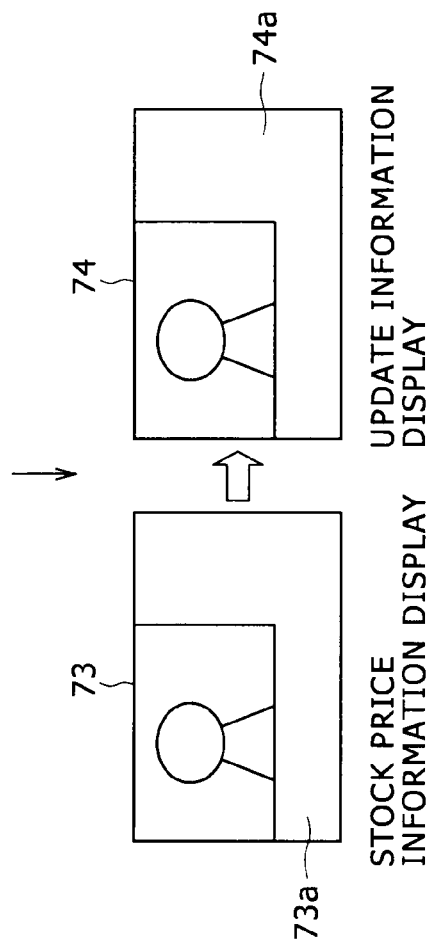

Referring to FIGS. 23A to 23C, there is shown a first example of processing that is executed when a trigger signal with the command code being application event is received.

FIG. 23A shows a trigger signal 74b with the command code being application event (inject_event), the application ID being identification information T1 for identifying Appli (T1) as a data broadcast application, and the event ID being identification information E1 for identifying event E1.

FIG. 23B shows one example in which Appli(T1) executes event E1 on the basis of E1 as the event ID included in the trigger signal 74b.

FIG. 23C shows event E1 for updating a video 73 including a stock price information 73a to a video 74 including a stock price information 74a.

Receiving the trigger signal 74b as shown in FIG. 23A for example, the application control block 90 extracts the application ID and the event ID from the received trigger signal 74b and supplies the extracted IDs to the application engine 91.

Of the launched data broadcast applications, the application engine 91 identifies the application Appli(T1) corresponding to T1 as the application ID supplied from the application control block 90.

Next, as shown in FIG. 23B, the application engine 91 makes the identified application Appli(T1) execute event E1 corresponding to the event ID supplied from the application control block 90.

To be more specific, as shown in FIG. 23C, the application engine 91 makes application Appli(T1) as the data broadcast application execute the processing of transitioning the video 73 displayed on the display monitor, not shown, to the video 74, for example.

It should be noted that, if it is necessary for the application engine 91 to get a file for transitioning the video 73 to the video 74 from one of the acquisition sources, the application engine 91 gets this file in substantially the same manner as described with reference to FIG. 12 and FIG. 21.

Namely, it is assumed that application Appli(T1) be made up of an HTML document and the specification of a file necessary for the execution of event E1 and the acquisition source flag of this file be indicated in the description in HTML of corresponding to event E1 to be executed as described with reference to FIG. 12 and FIG. 21, for example. In this case, on the basis of the description in HTML corresponding to event E1 to be executed, the application engine 91 gets the file necessary for the execution of event E1 from the acquisition source indicated by the acquisition source flag.

Then, by use of the obtained file, the application engine 91 executes the event E1 of transitioning the video 73 to video 74.

Referring to FIGS. 24A and 24B, there is shown a second example of processing to be executed when a trigger signal with the command code being application event is received.

FIG. 24A shows a trigger signal 74b having execution data (Event_Embedded_Data) being AppDataRef1, in addition to a command code, an application ID, and an event ID. The command code, the application ID, and the event ID shown in FIG. 24A are the same as the command code, the application ID, and the event ID shown in FIGS. 23A to 23C, so that the description of those shown in FIG. 24A is skipped.

It should be noted that AppDataRef1 is indicative of a common name space (a URL as a schema, a content ID, a file ID, and so on for example) necessary for specifying a file for use at the execution of event E1 and an acquisition source flag.

In this case, a common name space is included in AppDataRef1. For this reason, the application ID shown in FIG. 24 may only be identification information for identifying data broadcasting applications; for example, this application ID need not be an application ID that also represents a URL as a common name space such as the application ID shown in FIG. 11.

FIG. 24B shows one example in which Appli(T1) executes event E1 on the basis of E1 as an event ID included in the trigger signal 74b and AppDataRef1 as execution data.

Receiving the trigger signal 74b as shown in FIG. 24A for example, the application control block 90 makes the application engine 91 execute event E1 corresponding to the received trigger signal 74b in Appli(T1) launched by the application engine 91.

Namely, the application control block 90 extracts T1 as the application ID, E1 as the event ID, and AppDataRef1 as execution data from the received trigger signal 74b, for example.

Then, as shown in FIG. 24B, on the basis of the acquisition source flag included in the extracted AppDataRef1, the application control block 90 determines the server 42 as the acquisition source of the file (the application data shown in FIG. 24B) for use at the execution of event E1 and notifies the application engine 91 of the determination. The application control block 90 also notifies the application engine 91 of the name space included in the extracted AppDataRef1, T1 as the extracted application ID, and E1 as the extracted event ID.

On the basis of the name space supplied from the application control block 90, the application engine 91 gets the file for use at the execution of event E1 from the server 42 that is the acquisition source notified from the application control block 90. Next, the application engine 91 executes event E1 corresponding to the event ID notified from the application control block 90 by use of the obtained file in Appli(T1) corresponding to T1 notified from the application control block 90.

It should be noted that, receiving a trigger signal having the command code indicative of an application event, the application engine 91 gets the file for use at the execution of event E1 from the server 42; however, the file acquisition source is not restricted to the server 42. Namely, as shown in FIG. 25, the application engine 91 can get a file by use of a common name space and identifying the file by this name space from any of two or more acquisition sources in addition to the server 42, for example.

Referring to FIGS. 26A and 26B, there is shown a third example of the processing that is executed when a trigger signal of which command code being indicative of an application event is received.

FIG. 26A shows the trigger signal 74b with execution data (Event_Embedded_Data) being AD1, in addition to a command code, an application ID, and an event ID. The command code, the application ID, and the event ID shown in FIG. 26A are the same as the command code, the application ID, and the event ID shown in FIGS. 23A to 23C, so that the description of those shown in FIG. 26A is skipped.

It should be noted that AD1 is indicative of a file for use at the execution of event E1.

FIG. 26B shows an example of how Appli(T1) executes event E1 on the basis of E1 as the event ID included in the trigger signal 74b and AD1 as execution data.

Receiving the trigger signal 74b as shown in FIG. 26A for example, the application control block 90 executes event E1 corresponding to the received trigger signal 74b in Appli (T1) launched by the application engine 91.

To be more specific, the application control block 90 extracts T1 as the application ID, E1 as the event ID, and AD1 as the execution data from the received trigger signal 74b and notifies the application engine 91 of the extractions.

The application engine 91 executes event E1 corresponding to the event ID notified from the application control block 90 by use of AD1 notified from the application control block 90 in Appli(T1) corresponding to T1 notified from application control block 90.

(3) Variations

In the first and second embodiments described above, the reception apparatus 60 is configured to determine the acquisition source of each object file on the basis of an acquisition source flag. However, it is also practicable for the reception apparatus 60 to attempt the acquisition of each object file by sequentially determining acquisition sources in a predetermined sequence until a desired file is obtained without using the acquisition source flags.

In this case, there is no need for writing an acquisition source flag in a trigger signal or an HTML document, thereby reducing the data volume by an amount of the acquisition source flag. Therefore, a trigger signal can be transmitted with less data volume in the broadcasting apparatus 41 or an HTML document can be transmitted with less data volume in the server 42, thereby transmitting other items of information for these reduced data.

In the first and second embodiments described above, a broadcast application flag, a downloaded application flag, and an Internet application flag are used for the acquisition source flags. However, it is also practicable to use only two flags or four or more flags, for example, as acquisition source flags.

In the first and second embodiments described above, the reception apparatus 60 is configured to execute an object file by getting the object file from an acquisition source on the basis of a received trigger signal. However, the timing of getting an object file and executing the obtained object file is not restricted to the timing of reception of a trigger signal. Namely, an object file may be obtained from an acquisition source and executed in response to the specification of the object file by the user, for example. In addition, for example, in the first and second embodiments described above, a file to be executed in conjugation with AV content is obtained as an object file. However, the type of an object file is not restricted to this configuration; for example, any type of file may be obtained as an object file as long as the file is obtained to be executed in a predetermined manner in the reception apparatus 60.

In FIG. 11 and FIG. 12, a URL indicative of a name space for the server 42 is used as the information for specifying each object file. It is also practicable to use a name space for a digital television broadcast signal and a name space for the storage 88, for example.

It should be noted that the above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Exemplary Configuration of a Computer

Referring to FIG. 27, there is shown a block diagram illustrating an exemplary hardware configuration of a computer that executes the sequence of processing operations described above by software.

In a computer 200, a CPU (Central Processing Unit) 201, a ROM (Read Only Memory) 202, and a RAM (Random Access Memory) 203 are interconnected by a bus 204.

The bus 204 is connected to an input/output interface 205. The input/output interface 205 is connected to an input block 206 made up of a keyboard, a mouse, and a microphone, for example, an output block 207 made up of a display monitor and a loudspeaker, for example, a storage block 208 made up of a hard disk drive or a nonvolatile memory, for example, a communication block 209 made up of a network interface for example, and a drive 210 for driving a removable media 211, such as a magnetic disk, an optical disk, a magneto-optical disk, or a semiconductor memory, for example. In the computer configured as described above, the CPU 201 loads programs from the storage block 208 into the RAM 203 via the input/output interface 205 and the bus 204 to execute the sequence of processing operations described above, for example.

Each program that is run by the computer may be a program that executes the above-mentioned processing in a time-dependent manner in accordance with the sequence described herein or concurrently or on a demand basis.

Each program may be run by a single unit of computer or two or more units of computers in a distributed manner. In addition, each program may be transferred to a remote computer and executed therein.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

What is claimed is:

1. A reception apparatus, comprising:
   circuitry configured to
   receive a broadcast signal including AV (Audio/Video) content for display to a user and an application reference string including an acquisition source part and a file acquisition part for a file to be acquired by said reception apparatus, said acquisition source part indicating whether said file is available to be acquired from each of a plurality of different types of acquisition sources, said plurality of different types of acquisition sources including a broadcast stream and the Internet,
   determine which of said plurality of different types of acquisition sources said file is to be acquired from by said reception apparatus in a predetermined sequence from among said plurality of different types of acquisition sources of said file based on said acquisition source part,
   acquire said file from said acquisition source on the basis of said file acquisition part for use in acquiring said file from said plurality of different types of acquisition sources, said file acquisition part including a URL (Uniform Resource Locator) that is the same for each of said plurality of different types of acquisition sources, and
   execute said acquired file; and
   a memory configured to store said file, wherein
   the circuitry is configured to
   receive said broadcast signal and acquire said file from said broadcast signal when said determined one of said plurality of different types of acquisition sources is said broadcast stream, and
   acquire said file from a server via the Internet when said determined one of said plurality of different types of acquisition sources is the Internet.

2. The reception apparatus according to claim 1, wherein, if said file cannot be acquired from said acquisition source, said circuitry newly determines said acquisition source in said predetermined sequence.

3. The reception apparatus according to claim 2, wherein said circuitry determines said acquisition source in said sequence in which a priority of the Internet that is said acquisition source is lower than priorities of other ones of said plurality of different types of acquisition sources.

4. The reception apparatus according to claim 2, wherein, of said plurality of different types of acquisition sources including at least an accumulation storage block of said reception apparatus in which said file has already been accumulated, said circuitry determines said acquisition source in said sequence in which a priority of said accumulation storage block that is said acquisition source is higher than the priorities of said other ones of said plurality of different types of acquisition sources.

5. The reception apparatus according to claim 1, wherein, on the basis of said acquisition source part indicative of said acquisition source, said circuitry determines said acquisition source from among said plurality of different types of acquisition sources.

6. The reception apparatus according to claim 1, wherein said file acquisition part comprises a content identifier for identifying content at least made up of said file and file identification information for identifying said file managed for said content.

7. The reception apparatus according to claim 6, wherein said circuitry is configured to acquire said content from said acquisition source on the basis of said content identifier for identifying said content.

8. The reception apparatus according to claim 1, wherein said circuitry acquires said file from said acquisition source by use of the URL indicative of a location of said file stored in a server accessible via the Internet as said file acquisition part.

9. The reception apparatus according to claim 1, wherein the circuitry is further configured to extract a control signal including at least said acquisition source part indicative of said acquisition source and said file acquisition part from said broadcast signal,
determine said acquisition source from said plurality of different types of acquisition sources on the basis of said acquisition source part included in said extracted control signal, and
acquire said file from said acquisition source on the basis of said file acquisition part included in said extracted control signal.

10. The reception apparatus according to claim 1, wherein the circuitry is further configured to
extract said acquisition source part and said file acquisition part from a program to be executed at acquisition of said file, said program having said acquisition source part indicative of said acquisition source and said file acquisition part,
determine said acquisition source from among said plurality of different types of acquisition sources on the basis of said extracted acquisition source part, and
acquire said file from said acquisition source on the basis of said extracted file acquisition part.

11. The reception apparatus according to claim 1, wherein, as said file to be acquired by said reception apparatus for receiving said AV content, said circuitry determines said acquisition source in said predetermined sequence from among said plurality of different types of acquisition sources of said file to be executed in conjugation with progress of said AV content.

12. The reception apparatus according to claim 1, wherein said. plurality of different types of acquisition sources have different prioiities, and
the sequence of the determination is a priority sequence in accordance with the different priorities of said plurality of different types of acquisition sources.

13. The reception apparatus according to claim 1, wherein the acquisition source part includes an indicator for each of the plurality of different types of acquisition sources.

14. A reception method for a reception apparatus for receiving data comprising:
receiving a broadcast signal including AV (Audio/Video) content for display to a user and an application reference string including an acquisition source part and a file acquisition part for a file to be acquired by said reception apparatus, said acquisition source part indicating whether said file is available to be acquired from each of a plurality of different types of acquisition sources, said plurality of different types of acquisition sources including a broadcast stream and the Internet;
determining, by circuitry of said reception apparatus, which of said plurality of different types of acquisition sources said file is to be acquired from in a predetermined sequence based on said acquisition source part;
acquiring, by said circuitry, said file from said acquisition source on the basis of said file acquisition part for use in acquiring said file from said plurality of different types of acquisition sources, said file acquisition part including a URL (Uniform Resource Locator) that is the same for each of said plurality of different types of acquisition sources; and
executing said acquired file, wherein
the acquiring said file from said acquisition source includes
receiving said broadcast signal and acquiring said file from said broadcast signal when said determined one of said plurality of different types of acquisition sources is said broadcast stream, and
acquiring said file from a server via the Internet when said determined one of said plurality of different types of acquisition sources is the Internet.

15. A non-transitory computer-readable storage medium storing a program, when executed by a computer control a reception apparatus for receiving data, causing the reception apparatus to perform a method comprising:
receiving a broadcast signal including AV (Audio/Video) content for display to a user and an application reference string including an acquisition source part and a file acquisition part for a file to be acquired by said reception apparatus, said acquisition source part indicating whether said file is available to be acquired from each of a plurality of different types of acquisition sources, said plurality of different types of acquisition sources including a broadcast stream and the Internet;
determining which of said plurality of different types of acquisition sources said file is to be acquired from in a predetermined sequence based on said acquisition source part;
acquiring said file from said acquisition source on the basis of said file acquisition part for use in acquiring said file from said plurality of different types of acquisition sources, said file acquisition part including a URL (Uniform Resource Locator) that is the same for each of said plurality of different types of acquisition sources; and
executing said acquired file, wherein
the acquiring said file from said acquisition source includes
receiving said broadcast signal and acquiring said file from said broadcast signal when said determined one of said plurality of different types of acquisition sources is said broadcast stream, and
acquiring said file from a server via the Internet when said determined one of said plurality of different types of acquisition sources is the Internet.

16. A transmission apparatus for transmitting AV (Audio/Video) content, comprising:
circuitry configured to
store a control signal associated with a file for making a reception apparatus execute said file in synchronization with said AV content, and
transmit a broadcast signal including said AV content for display to a user of said reception apparatus and said control signal, wherein
said control signal includes an application reference string, the application reference string including an acquisition source part that indicates whether said file is available to be acquired from each of a plurality of different types of acquisition sources of said file and including a file acquisition part for acquiring said file from said plurality of different types of acquisition sources,
said file acquisition part including a URL (Uniform Resource Locator) that is the same for each of said plurality of different types of acquisition sources,
said plurality of different types of acquisition sources includes a broadcast stream and the Internet,
said control signal causes a reception apparatus to receive said broadcast signal and acquire said file from said broadcast signal when said reception apparatus determines that said file is to be acquired from a broadcast stream based on said acquisition source part, and said control signal causes said reception apparatus to acquire said file from a server via the Internet when said file is to be acquired from the Internet based on said acquisition source part.

17. The transmission apparatus according to claim 16, wherein said file acquisition part comprises a content identifier for identifying content made up of said file.

18. The transmission apparatus according to claim 16, wherein said control signal includes a content identifier for identifying content at least made up of said file, said file acquisition part made up of file identification information for identifying said file managed for each of said content.

19. A transmission method for a transmission apparatus for transmitting AV (Audio/Video) content, comprising:
storing a control signal associated with a file for making a reception apparatus execute said file in synchronization with said AV content; and
transmitting a broadcast signal including said AV content for display to a user of said reception apparatus and said control signal, wherein
said control signal includes an application reference string, the application reference string including an acquisition source part that indicates whether said file is available to be acquired from each of a plurality of different types of acquisition sources of said file and including a file acquisition part for acquiring said file from said plurality of different acquisition sources,
said file acquisition part including a URL (Uniform Resource Locator) that is the same for each of said plurality of different types of acquisition sources,
said plurality of different types of acquisition sources includes a broadcast stream and the Internet,
said control signal causes a reception apparatus to receive said broadcast signal and acquire said file from said broadcast signal when said reception apparatus determines that said file is to be acquired from a broadcast stream based on said acquisition source part, and
said control signal causes said reception apparatus to acquire said file from a server via the Internet when said file is to be acquired from the Internet based on said acquisition source part.

20. A non-transitory computer-readable storage medium storing a program, when executed by a computer control a transmission apparatus for transmitting AV (Audio/Video) content, causing the transmission apparatus to perform a method comprising:
storing a control signal associated with a file for making a reception apparatus execute said file in synchronization with said AV content; and
transmitting a broadcast signal including said AV content for display to a user of said reception apparatus and said control signal, wherein
said control signal includes an application reference string, the application reference string including an acquisition source part that indicates whether said file is available to be acquired from each of a plurality of different types of acquisition sources of said file and including a file acquisition part for acquiring said file from said plurality of different types of acquisition sources,
said file acquisition part including a URL (Uniform Resource Locator) that is the same for each of said plurality of different types of acquisition sources, wherein
said plurality of different types of acquisition sources includes a broadcast stream and the Internet,
said control signal causes a reception apparatus to receive said broadcast signal and acquire said file from said broadcast signal when said reception apparatus determines that said file is to be acquired from a broadcast stream based on said acquisition source part, and
said control signal causes said reception apparatus to acquire said file from a server via the Internet when said file is to be acquired from the Internet based on said acquisition source part.

21. A broadcasting system comprising:
a transmission apparatus for transmitting AV (Audio/Video) content, said transmission apparatus including
means for storing a control signal associated with a file for making a reception apparatus execute said file in synchronization with said AV content, and
means for transmitting a broadcast signal including said AV content and said control signal,
said control signal including an application reference string, the application reference string including an acquisition source part that indicates whether said file is available to be acquired from each of a plurality of different types of acquisition sources of said file and including a file acquisition part for acquiring said file from said plurality of different types of acquisition sources, said file acquisition part including a URL (Uniform Resource Locator) that is the same for each of said plurality of different types of acquisition sources, said plurality of different types of acquisition sources including a broadcast stream and the Internet; and
a reception apparatus for receiving said transmitted AV content for display to a user, said reception apparatus including
means for extracting said control signal including said application reference string transmitted with said AV content,
means for determining which of said plurality of different types of acquisition sources said file is to be acquired from by said reception apparatus in a predetermined sequence from among said plurality of different types of acquisition sources of said file based on said acquisition source part,
means for acquiring said file from said acquisition source on the basis of said file acquisition part included in said extracted control signal, and
means for executing said acquired file.

* * * * *